(12) United States Patent
Uematsu et al.

(10) Patent No.: US 7,917,847 B2
(45) Date of Patent: Mar. 29, 2011

(54) METHOD, PROGRAM AND TERMINAL DEVICE FOR RENDERING WEB PAGE

(75) Inventors: Michimasa Uematsu, Tokyo (JP); Takao Sekine, Tokyo (JP); Yukihiro Hayashi, Tokyo (JP); Takuya Harakawa, Tokyo (JP); Shinji Yamabuchi, Tokyo (JP)

(73) Assignee: Access Co., Ltd., Chiyoda-ku, Tokyo (JP)

( * ) Notice: Subject to any disclaimer, the term of this patent is extended or adjusted under 35 U.S.C. 154(b) by 0 days.

(21) Appl. No.: 10/577,749

(22) PCT Filed: Nov. 1, 2004

(86) PCT No.: PCT/JP2004/016509
§ 371 (c)(1),
(2), (4) Date: Apr. 27, 2006

(87) PCT Pub. No.: WO2005/043410
PCT Pub. Date: May 12, 2005

(65) Prior Publication Data
US 2007/0083534 A1    Apr. 12, 2007

(30) Foreign Application Priority Data

Oct. 31, 2003 (JP) ................................. 2003-371571
Jul. 30, 2004 (JP) ................................. 2004-224815

(51) Int. Cl.
*G06N 3/00* (2006.01)
(52) U.S. Cl. ....................... 715/236; 715/234
(58) Field of Classification Search .................. 715/234, 715/243, 254, 255, 235, 236
See application file for complete search history.

(56) References Cited

U.S. PATENT DOCUMENTS

| 3,872,460 | A | * | 3/1975 | Fredrickson et al. | ......... 715/788 |
| 7,017,125 | B1 | | 3/2006 | Matsumoto et al. | |
| 7,020,839 | B1 | | 3/2006 | Hosoda et al. | |
| 7,082,577 | B1 | * | 7/2006 | Brosnahan | ..................... 715/860 |
| 2002/0010707 | A1 | * | 1/2002 | Chang et al. | .................. 707/500 |
| 2003/0011631 | A1 | | 1/2003 | Halahmi | |

(Continued)

FOREIGN PATENT DOCUMENTS

CN         1292619 A        4/2001

(Continued)

OTHER PUBLICATIONS

Kaneko, M. (Aug. 1995). "Professional of Net-Surfing: Netscape with Complete Control: That's Why You Obtain Netscape/Netscape Navigator/Tune Up Netscape Navigator/Master Minor Technique," *Internet Magazine*, pp. 64-80.

(Continued)

*Primary Examiner* — Kyle R Stork
(74) *Attorney, Agent, or Firm* — Morrison & Foerster LLP

(57) ABSTRACT

A method of rendering a page, which includes starting obtaining operation for obtaining a page made by a markup language, performing a text browsing mode operation on obtained part of data of the page in parallel with the obtaining operation of the page, judging whether or not acquisition of definition information which is information to be applied to the entire page so as to render the page as designated by a markup language document of the page is finished, and switching onscreen representation, depending on a result of the judging, from onscreen representation in a text browsing mode to onscreen representation in which the definition information is applied.

80 Claims, 9 Drawing Sheets

U.S. PATENT DOCUMENTS

2004/0085331 A1* 5/2004 Sai ................................. 345/634
2007/0016915 A1* 1/2007 Mukundan et al. ........... 719/330

FOREIGN PATENT DOCUMENTS

| CN | 1320335 A | 10/2001 |
|---|---|---|
| JP | 09-231119 A | 9/1997 |
| JP | 11-212889 A | 8/1999 |
| JP | 2987355 B2 | 10/1999 |
| JP | 2001-101060 A | 4/2001 |
| JP | 2001-209571 A | 8/2001 |
| WO | 03/079227 A2 | 9/2003 |

OTHER PUBLICATIONS

International Search Report mailed Jun. 24, 2005, for international application No. PCT/JP2004/016509, filed Nov. 1, 2004, 6 pages.

Koizumi, Osamu (Nov. 10, 2001) "Web technology with illustrations by diagrams." Nihon Jitsugyo Publishing Co., Ltd., pp. 131-136, 140-142. (Explanation of Relevance located in specification on p. 3, line 6).

Lie, H. W. et al. (Jan. 11, 1999) "Cascading Style Sheets, level 1" W3C *Recommendation*, <http://www.w3.org/TR/Css1>, printed Oct. 28, 2003, pp. 1-66.

Bleich "Das Web in der Hand WWW-Brewser für PDA's",CT Magazin Für Computer Technik, Verag Heinz Heise GmbH; Honnover, DE, No. 3 Jan. 27, 2003, 144-149.

Office Action issued Nov. 24, 2005 by the Japanese Patent Office in Japanese Application No. 2004-315873, 3 pages (3 pages English Translation).

Office Action issued Mar. 24, 2006 by the Japanese Patent Office in Japanese Application No. 2004-315873, 4 pages (4 pages English Translation).

Chinese Office Action issued Mar. 7, 2008 by the State Intellectual Property Office of the People's Republic of China in Application No. CN 200480030686.3, 5 pages (5 pages English Translation).

* cited by examiner

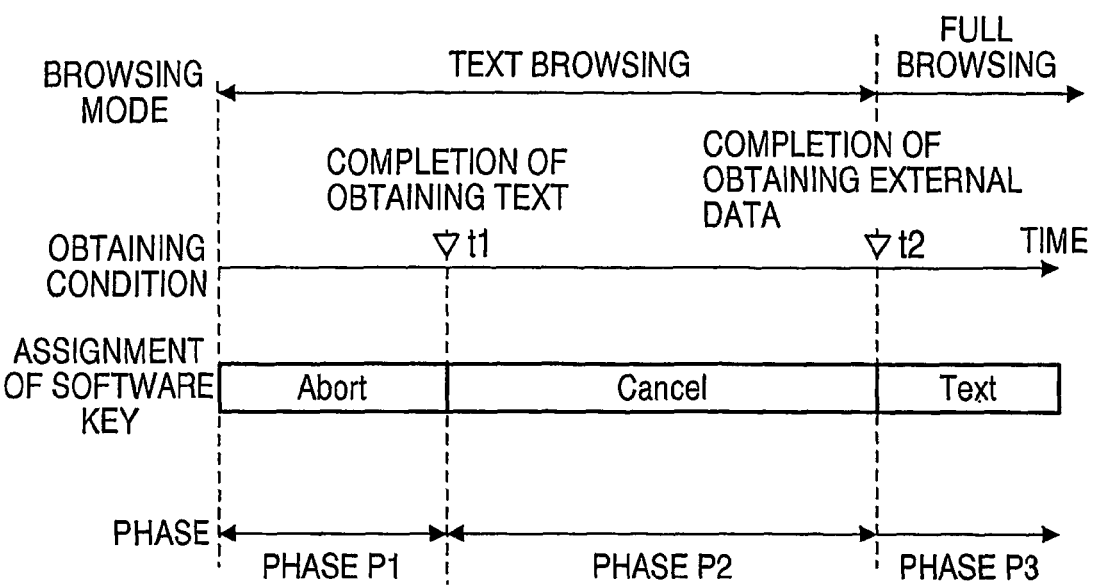
FIG. 7
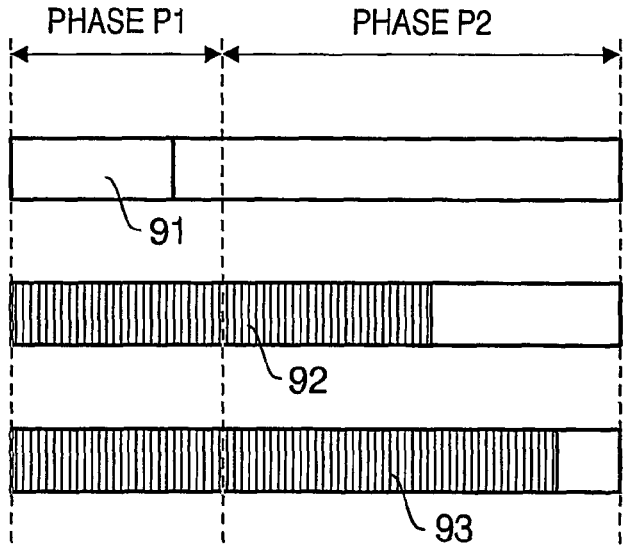
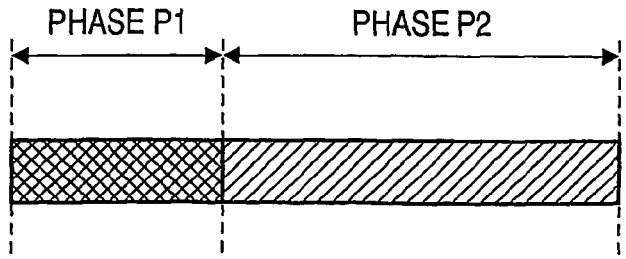
FIG. 9

US 7,917,847 B2

METHOD, PROGRAM AND TERMINAL DEVICE FOR RENDERING WEB PAGE

CROSS REFERENCE TO RELATED APPLICATIONS

This application is a 35 U.S.C. §371 National Stage filing of International Patent Application No. PCT/JP2004/016509, titled METHOD, PROGRAM AND TERMINAL DEVICE FOR RENDERING WEB PAGE, filed Nov. 1, 2004, which claims the benefit of Japanese Application No. 2004-224815, titled METHOD, PROGRAM AND TERMINAL DEVICE FOR RENDERING WEB PAGE, filed Jul. 30, 2004, and Japanese Application No. 2003-371571, titled METHOD, PROGRAM AND TERMINAL DEVICE FOR RENDERING WEB PAGE, filed Oct. 31, 2003, all of which are incorporated herein by reference in their entireties.

FIELD OF THE INVENTION

The present invention relates to a browser for browsing contents on a network such as the Internet.

BACKGROUND OF THE INVENTION

Recently, with the widespread use of the Internet as a background, browsing contents described by a markup language such as an HTML (hypertext markup language) is performed on various types of terminal devices, such as a mobile phone, a PDA (personal digital assistant), a household electric appliance and a car navigation system, as well as a personal computer. In general, a software called a browser is used to execute the browsing of contents.

FIG. 4 is a flowchart illustrating a rendering process of a conventional browser running on a personal computer. As shown in FIG. 4, the browser starts obtaining a web page designated by a user through a network (step S11). In subsequent steps S12 through S15, it is judged whether external cascading style sheets (external CSS) and an external script are included in the obtained web page (i.e., the obtained HTML document), and thereafter the external CSS and the external script are obtained if they are included in the obtained web page.

The "external CSS" means a CSS to be obtained through a network. The "external script" means a script to be obtained through a network.

When the external CSS is included in the obtained web page (S12:YES), the external CSS is obtained through the network (S13). Then, control proceeds to step S14. When the external CSS is not included in the obtained web page (S12: NO), control proceeds to step S14.

In step S14, it is judged whether the external script is included in the obtained web page. When the external script is included in the obtained web page (S14:YES), the external script is obtained through the network (S15). Then, control proceeds to step S16. When the external script is not included in the obtained web page (S14:NO), control proceeds to step S16. In step S16, rendering of the obtained web page (i.e., displaying operation of the obtained web page) is executed.

As can be seen from the flowchart shown in FIG. 4, the conventional browser does not perform displaying operation of a web page until acquisition of external data (i.e., an external CSS and an external script) is completed. That is, a screen image of a web page designated by a user is not displayed on a screen until a time period from step S11 to step S15 has elapsed. The reason is that the style sheet and the script are data to be applied to the entire web page to be processed, and therefore the obtained web page can not be displayed as intended by a designer of the web page until the external data is completely obtained.

Accordingly, the user is required to wait until the displaying of a web page is started at step S16 after the designation of the web page.

In a publication, "Web technology with illustrations by diagrams", Osamu Koizumi, Nihon Jitsugyo Publishing CO., LTD, Nov. 10, 2001, pages 131-136 and pages 140-142, a property of a script is described. That is, it is disclosed in the publication that the style sheet is information to be applied to the entire web page.

W3C Recommendation concerning the style sheet is also explained in detail in a publication, "W3C Recommendation Cascading Style Sheet Level 1", which can be obtained from a URL: http://www.w3.org/TR/CSS1.

It should be note that although in the flowchart in FIG. 4 the presence or absence of the external CSS and the external script is judged in this order in accordance with a typical structure of a web page. However, the order of designation of the external CSS and the external script varies among web pages because the order is decided by a designer's intention. Therefore, modifications of the flowchart of FIG. 4 (e.g., a modification in which the order of step S12 and step S14 is reversed) can be made depending on the type of a targeted web page.

SUMMARY OF THE INVENTION

The disadvantages of terminal devices such as a mobile phone, a PDA, a vehicle-installed device and a network-connected home appliances in comparison with a personal computer are as follows:
a screen size is small;
data transmission speed is relatively low;
performance of a CPU (central processing unit) is low; and
memory size is small.

In the following, such a terminal device having the disadvantages mentioned above will be referred to as a portable device.

If the rendering process of the browser is executed on such a portable device, the time period between the start of acquisition of a web page (step S13) and the displaying of the web page (step S16) becomes larger relative to a personal computer because of the disadvantages of the portable device. The processing rate of the browser becomes smaller particularly for a web page targeted for a personal computer because the size of contents (the web page) targeted for the personal computer is typically large.

One of techniques for suppressing decrease of the processing rate of the browser running on the portable device is to skip the acquisition of external data, including an external CSS, an external script and image data embedded in a web page using, for example, an <img> tag (hereafter, referred to as an embedded image data), so as to avoid data transmission of a large amount of data which causes the decrease of processing rate of the browser. This technique corresponds to skipping at least one of step S13 and step S15 in the rendering process shown in FIG. 4.

Japanese Patent Publication NO. 2987355 discloses a technique to enhance processing rate of a browser. In this publication (specifically, in paragraphs 33 and 39 of this publication), the browser operates to skip acquisition of embedded images and to display icons in place of displaying the embedded images. By this technique, links (e.g., anchor tags designated as <a href="…">) designated in a web page are displayed quickly. That is, this technique enables the browser to quickly transfer to a destination linked by an anchor tag.

Another technique for suppressing the decrease of a processing rate of a browser running on the portable device is to configure a browser to limit the functions of the browser regarding tags, attributes, CSS and a script. By this technique, the rendering process (i.e., a displayed image of a web page) is simplified, and thereby the decrease of the processing rate of the browser due to, for example, a low CPU speed, can be suppressed.

It is noted that although the above mentioned techniques can suppress the decrease of a processing rate of a rendering process for a web page, the web page can not be displayed as intended by a designer of the web page. That is, deterioration in quality of a web page is caused.

The present invention is advantageous in that it provides a method and a terminal device for rendering a web page configured to enhance perceptible processing rate sensible to a user and to prevent deterioration in displaying quality of the web page.

According to an aspect of the invention, there is provided a method of rendering a page, which includes starting obtaining operation for obtaining a page made by a markup language, and performing a text browsing mode operation on obtained part of data of the page in parallel with the obtaining operation of the page. The method further includes judging whether or not acquisition of definition information which is information to be applied to the entire page so as to render the page as designated by a markup language document of the page is finished, and switching onscreen representation, depending on a result of the judging, from onscreen representation in a text browsing mode to onscreen representation in which the definition information is applied.

With this configuration, perceptible processing rate of a web page sensible to a user is enhanced while deterioration in displaying quality of the web page is avoided.

According to another aspect of the invention, there is provided a method of rendering a page, which includes starting obtaining operation for obtaining a page made by a markup language, and performing a text browsing mode operation on obtained part of data of the page in parallel with the obtaining operation of the page. The method further includes judging whether or not data of a predetermined number of screenfulls of data of the page is obtained, and switching onscreen representation, depending on a result of the judging, from onscreen representation in a text browsing mode to onscreen representation in which definition information designated in a markup language document of the page and applied to the entire page so as to render the page as designated by the document is applied.

With this configuration, perceptible processing rate of a web page sensible to a user is enhanced while deterioration in displaying quality of the web page is avoided.

According to another aspect of the invention, there is provided a method of rendering a page, which includes starting obtaining operation for obtaining a page made by a markup language, and performing a text browsing mode operation on obtained part of data of the page in parallel with the obtaining operation of the page. The method further includes judging whether or not a predetermined time period has elapsed from a start of the obtaining operation, and switching onscreen representation, depending on a result of the judging, from onscreen representation in a text browsing mode to onscreen representation in which definition information designated in a markup language document of the page and applied to the entire page so as to render the page as designated by the document is applied.

With this configuration, perceptible processing rate of a web page sensible to a user is enhanced while deterioration in displaying quality of the web page is avoided.

According to another aspect of the invention, there is provided a method of rendering a page, which includes starting obtaining operation for obtaining a page made by a markup language, and performing a text browsing mode operation on obtained part of data of the page in parallel with the obtaining operation of the page. The method further includes judging whether or not predetermined user operation is performed, and switching onscreen representation, depending on a result of the judging, from onscreen representation in a text browsing mode to onscreen representation in which definition information designated in a markup language document of the page and applied to the entire page so as to render the page as designated by the document is applied.

With this configuration, perceptible processing rate of a web page sensible to a user is enhanced while deterioration in displaying quality of the web page is avoided.

Optionally, the predetermined user operation may include operation for canceling the switching of the onscreen representation. In this case, the switching of the onscreen representation may be cancelled if it is judged that the predetermined user operation is performed, and the switching of the onscreen representation may be performed if it is judged that the predetermined user operation is not performed.

Still optionally, the switching may be controlled in three stages including a first stage from a start of the obtaining operation of the page to a time of completion of acquisition of text data of the page, a second stage from the time of the completion of acquisition of the text data of the page to a time of completion of acquisition of the definition information, and a third stage after the completion of acquisition of the definition information. In this case, the onscreen representation in the text browsing mode is made during the first stage, notification notifying execution of the switching is added to the onscreen representation in the text browsing mode during the second stage, and the onscreen representation in which the definition information is applied is made during the third stage if the predetermined user operation is not performed.

Still optionally, the operation for canceling the switching of the onscreen representation may be allowed only in the second stage.

In a particular case, the operation for canceling the switching of the onscreen representation may be allowed in a certain time period from completion of acquisition of the definition information.

In a particular case, the operation for canceling the switching of the onscreen representation may be allowed in a certain time period between a first time before completion of acquisition of the definition information and a second time after the completion of acquisition of the definition information.

In a particular case, the onscreen representation in the text browsing mode may be made during a first stage from a start of the obtaining operation of the page to a time of completion of acquisition of text data of the page. In this case, the operation for canceling the switching of the onscreen representation is allowed in a certain time period from completion of acquisition of the definition information.

Optionally, the operation for canceling the switching of the onscreen representation may not be allowed in the first stage, and operation for canceling acquisition of the data of the page may be allowed in the first stage.

In a particular case, the operation for canceling the switching of the onscreen representation may include at least one of scrolling operation, storing operation and printing operation.

In a particular case, the predetermined user operation may include operation for performing the switching of the onscreen representation. In this case, according to the result of the judging, the switching of the onscreen representation is performed if a result of the judging is that the predetermined user operation is performed, and the switching of the onscreen representation is not performed if a result of the judging is that the predetermined user operation is not performed.

Optionally, the onscreen representation may be controlled in three stages including a first stage from a start of the obtaining operation of the page to a time of completion of acquisition of text data of the page, a second stage from the time of the completion of acquisition of the text data of the page to a time of completion of acquisition of the definition information, and a third stage after the completion of acquisition of the definition information. In this case, the onscreen representation in the text browsing mode is made during the first stage, notification notifying that execution of the switching is available is added to the onscreen representation in the text browsing mode during the second stage, and the i onscreen representation in the text browsing mode is continued during the third stage if the predetermined user operation is not performed.

Optionally, the operation for performing the switching of the onscreen representation may be allowed in the second and third stages.

In a particular case, the method may include storing information regarding a focus position and a scrolling position in the text browsing mode, and restoring the focus position and the scrolling position, based on the stored information, in a mode in which the definition information is applied.

Optionally, the restoring may include judging whether or not the focus position is within a displaying area defined by the scrolling position, and adjusting the focus position so that the focus position is within the displaying area if it is judged that the focus position is not within the displaying area.

Optionally, the adjusting the focus position may be performed so that a scrolling amount from the top of a page is minimized and a focus target is displayed appropriately.

Optionally, the restoring the focus position and the scrolling position may be performed so that an item adjacent to the focus position to be restored stored is used as a focus target in the mode in which the definition information is reflected if it is judged that a focus target in the text browsing mode does not exist at a position to be restored in the mode in which the definition information is reflected.

Still optionally, the onscreen representation in the text browsing mode and the onscreen representation in which the definition information is applied may be made based on a same document described by a markup language of the page, and the information regarding the focus position and the scrolling position may be stored in association with the same document.

In a particular case, the definition information may include an external style sheet.

In a particular case, the definition information may include an external script.

In a particular case, the obtaining operation for obtaining the page may include (1) judging whether designation of an external style sheet is contained in the page, and obtaining the external style sheet through a network if it is judged that the designation of the external style sheet is contained in the page, and judging whether designation of an external script is contained in the page, and obtaining the external script through the network if it is judged that the designation of the external script is contained in the page.

In a particular case, the method may include continuing obtaining operation for obtaining remaining data of the page and displaying operation for the remaining data of the page after the switching of the onscreen representation is performed.

According another aspect of the invention, there is provided a method of rendering a page, which includes starting obtaining operation for obtaining a page made by a markup language, and performing a text browsing mode operation on obtained part of data of the page in parallel with the obtaining operation of the page. The method further includes judging whether or not acquisition of the whole data of the page is completed, and switching onscreen representation, depending on a result of the judging, from onscreen representation in a text browsing mode to onscreen representation in which definition information designated in a markup language document of the page and applied to the entire page so as to render the page as designated by the document is applied.

With this configuration, perceptible processing rate of a web page sensible to a user is enhanced while deterioration in displaying quality of the web page is avoided.

According another aspect of the invention, there is provided a method of rendering a page, there is provided a method of rendering a page, which includes starting obtaining operation for obtaining a page made by a markup language, and performing a first mode operation in which an external style sheet obtained by the obtaining operation is applied in onscreen representation in a text browsing mode. The method further includes judging whether or not data of a predetermined number of screenfulls of data of the page is obtained, and switching onscreen representation, depending on a result of the judging, from onscreen representation of the first mode operation to onscreen representation in which definition information designated in a markup language document of the page and applied to the entire page so as to render the page as designated by the document is applied.

With this configuration, perceptible processing rate of a web page sensible to a user is enhanced while deterioration in displaying quality of the web page is avoided.

According another aspect of the invention, there is provided a method of rendering a page, which includes starting obtaining operation for obtaining a page made by a markup language, performing firstly displaying operation on data of the page without using definition information to be applied to the entire page so as to render the page as designated by a markup language document of the page, and performing secondly displaying operation of the data of the page using definition information in the page.

With this configuration, perceptible processing rate of a web page sensible to a user is enhanced while deterioration in displaying quality of the web page is avoided.

According another aspect of the invention, there is provided a method of rendering a page, which includes starting obtaining operation for obtaining a page made by a markup language, and performing operation in a first browsing mode which makes less rich presentation on a screen than a second browsing mode in which an external style sheet and an external script in the page are applied. The method further includes judging whether or not acquisition of the external style sheet and the external script is finished, and switching onscreen representation, depending on a result of the judging, from onscreen representation in the first browsing mode to onscreen representation in the second browsing mode.

With this configuration, perceptible processing rate of a web page sensible to a user is enhanced while deterioration in displaying quality of the web page is avoided.

According another aspect of the invention, there is provided a method of rendering a page, which includes starting obtaining operation for obtaining a page made by a markup language, and performing operation in a first browsing mode which makes less rich presentation on a screen than a second browsing mode in which an external style sheet and an external script in the page are applied. The method further includes judging whether or not data of a predetermined number of screenfulls of data of the page is obtained, and switching onscreen representation, depending on a result of the judging, from onscreen representation in the first browsing mode to onscreen representation in the second browsing mode.

With this configuration, perceptible processing rate of a web page sensible to a user is enhanced while deterioration in displaying quality of the web page is avoided.

According another aspect of the invention, there is provided a method of rendering a page, which includes starting obtaining operation for obtaining a page made by a markup language, and performing operation in a first browsing mode which makes less rich presentation on a screen than a second browsing mode in which an external style sheet and an external script in the page are applied. The method further includes judging whether or not a predetermined time period has elapsed from a start of the obtaining operation, and switching onscreen representation, depending on a result of the judging, from onscreen representation in the first browsing mode to onscreen representation in the second browsing mode.

With this configuration, perceptible processing rate of a web page sensible to a user is enhanced while deterioration in displaying quality of the web page is avoided.

According another aspect of the invention, there is provided a method of rendering a page, which includes starting obtaining operation for obtaining a page made by a markup language, and performing operation in a first browsing mode which makes less rich presentation on a screen than a second browsing mode in which an external style sheet and an external script in the page are applied. The method further includes judging whether or not predetermined user operation is performed, and switching onscreen representation, depending on a result of the judging, from onscreen representation in the first browsing mode to onscreen representation in the second browsing mode.

With this configuration, perceptible processing rate of a web page sensible to a user is enhanced while deterioration in displaying quality of the web page is avoided.

According another aspect of the invention, there is provided a method of rendering a page, which includes starting obtaining operation for obtaining a page made by a markup language, and performing operation in a first browsing mode which makes less rich presentation on a screen than a second browsing mode in which an external style sheet and an external script in the page are applied. The method further includes judging whether or not acquisition of the whole data of the page is completed, and switching onscreen representation, depending on a result of the judging, from onscreen representation in the first browsing mode to onscreen representation in the second browsing mode.

With this configuration, perceptible processing rate of a web page sensible to a user is enhanced while deterioration in displaying quality of the web page is avoided.

According another aspect of the invention, there is provided a terminal device, which includes a screen on which onscreen representation is formed, a network interface interfacing with a network, and a controller configured to perform functions including:

(a) starting obtaining operation for obtaining a page made by a markup language through the network;

(b) performing operation in a first browsing mode which makes less rich presentation on a screen than a second browsing mode in which an external style sheet and an external script in the page are applied;

(c) judging whether or not acquisition of the external style sheet and the external script is finished; and (d) switching onscreen representation, depending on a result of the judging, from onscreen representation in the first browsing mode to onscreen representation in the second browsing mode.

With this configuration, perceptible processing rate of a web page sensible to a user is enhanced while deterioration in displaying quality of the web page is avoided.

According another aspect of the invention, there is provided a computer program product for use on a terminal device. The computer program product includes a computer program executed to achieve a method of rendering a page. The method includes starting obtaining operation for obtaining a page made by a markup language, performing operation in a first browsing mode which makes less rich presentation on a screen than a second browsing mode in which an external style sheet and an external script in the page are applied, judging whether or not acquisition of the external style sheet and the external script is finished, and switching onscreen representation, depending on a result of the judging, from onscreen representation in the first browsing mode to onscreen representation in the second browsing mode.

With this configuration, perceptible processing rate of a web page sensible to a user is enhanced while deterioration in displaying quality of the web page is avoided.

BRIEF DESCRIPTION OF THE DRAWINGS

The present invention will be understood and appreciated from the following detailed description, taken in conjunction with the drawings in which:

FIG. 7 is a timing chart illustrating a progress of a user selection switching operation #1;

FIG. 8A shows a progressive bar in a situation in which the user selection switching operation #1 is in a first phase;

FIG. 8B shows a progressive bar 92 in a situation in which the user selection switching operation #1 is at the midpoint of a second phase;

FIG. 8C shows a progressive bar in a situation in which the user selection switching operation #1 is at the tail end of the second phase;

FIG. 9 shows an example of a progressive bar having two colors respectively corresponding to the first phase and the second phase;

DETAILED DESCRIPTION OF THE EMBODIMENT

Hereinafter, an embodiment of the invention will be described with reference to the accompanying drawings.

In this description, the terms "style sheet", "script", "page" are defined as follows.

"style sheet": information of a style regarding a markup language document. CSS (cascading style sheet is one example of style sheet)

"script": a script of which target of operation is a markup language.

"page": a series of data, included in a markup language document, which is displayed on a screen by a browser.

"text browsing mode": a browsing mode in which a browser forms onscreen representation in accordance with text information in a page without applying external style sheets and external scripts to the page. User operation including anchor selection and scrolling is also possible in the text browsing mode.

The style sheet and the script are categorized as definition information which is to be applied to the entire page so as to render the page as designated by a markup language document of the page.

Figure 1:
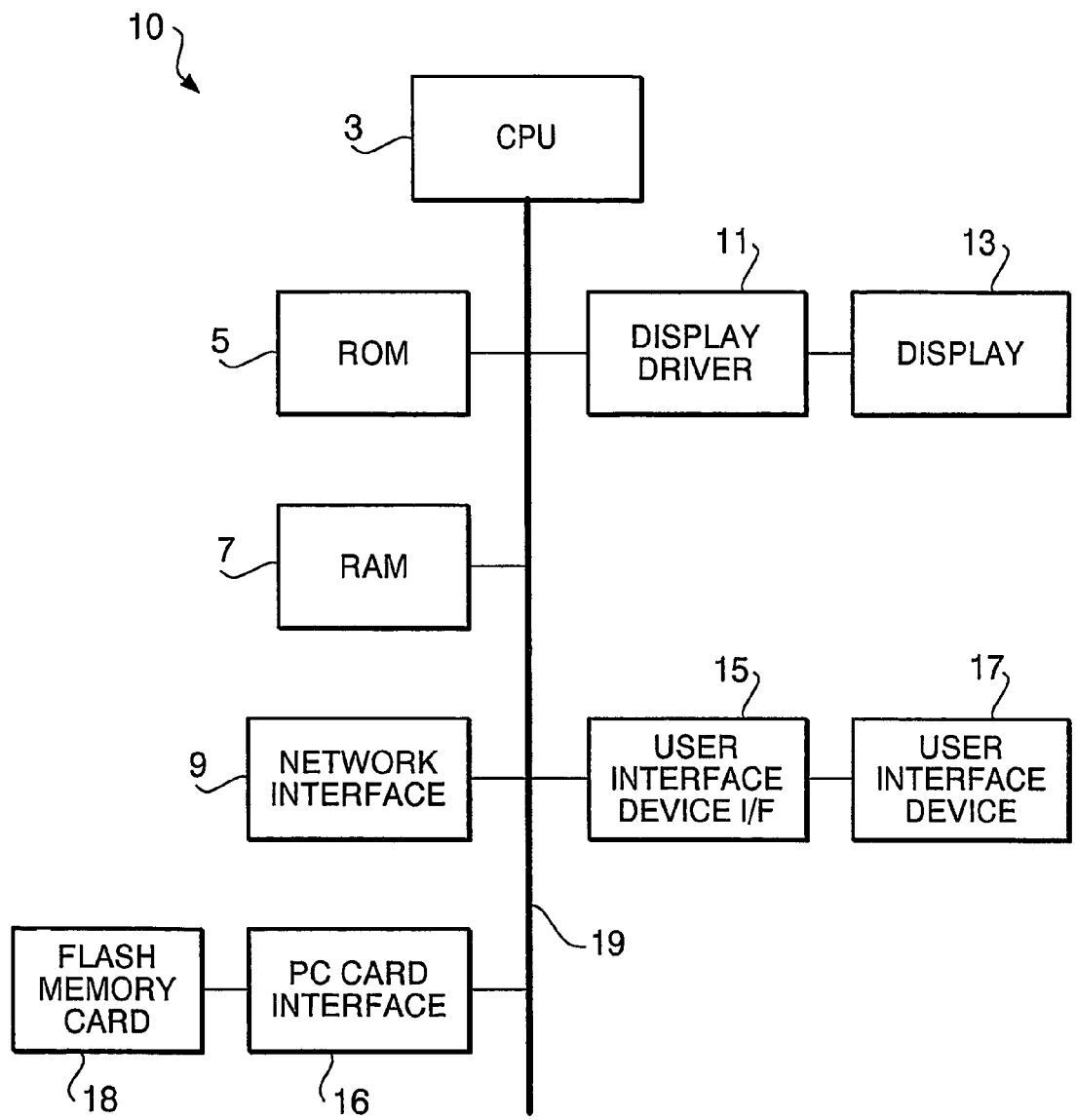
FIG. 1 is a block diagram of a control system of a terminal device according to an embodiment of the invention.

FIG. 1 is a block diagram of a control system of a terminal device 10 according to an embodiment of the invention. In this embodiment, the terminal device 10 is configured as a mobile phone. As shown in FIG. 1, the terminal device 10 includes a CPU (central processing unit) 3 which operates to control the overall components in the terminal device 10. The terminal device 10 further includes a ROM (read only memory) 5, a RAM (random access memory) 7, a network interface 9, a PC card interface 16, a display driver 11 and an user interface device I/F 15, which are connected to the CPU 3 via a bus 19.

The CPU 3 is connected with a display 13 via the display driver 11, and is connected with a user interface device 17 via the user interface device I/F 15. The user interface device 17 is a key operation unit including an up-down key and numeric keys. Various types of PC cards such as a flash memory card 18 can be inserted into a slot provided in the PC card interface 16.

Figure 2:
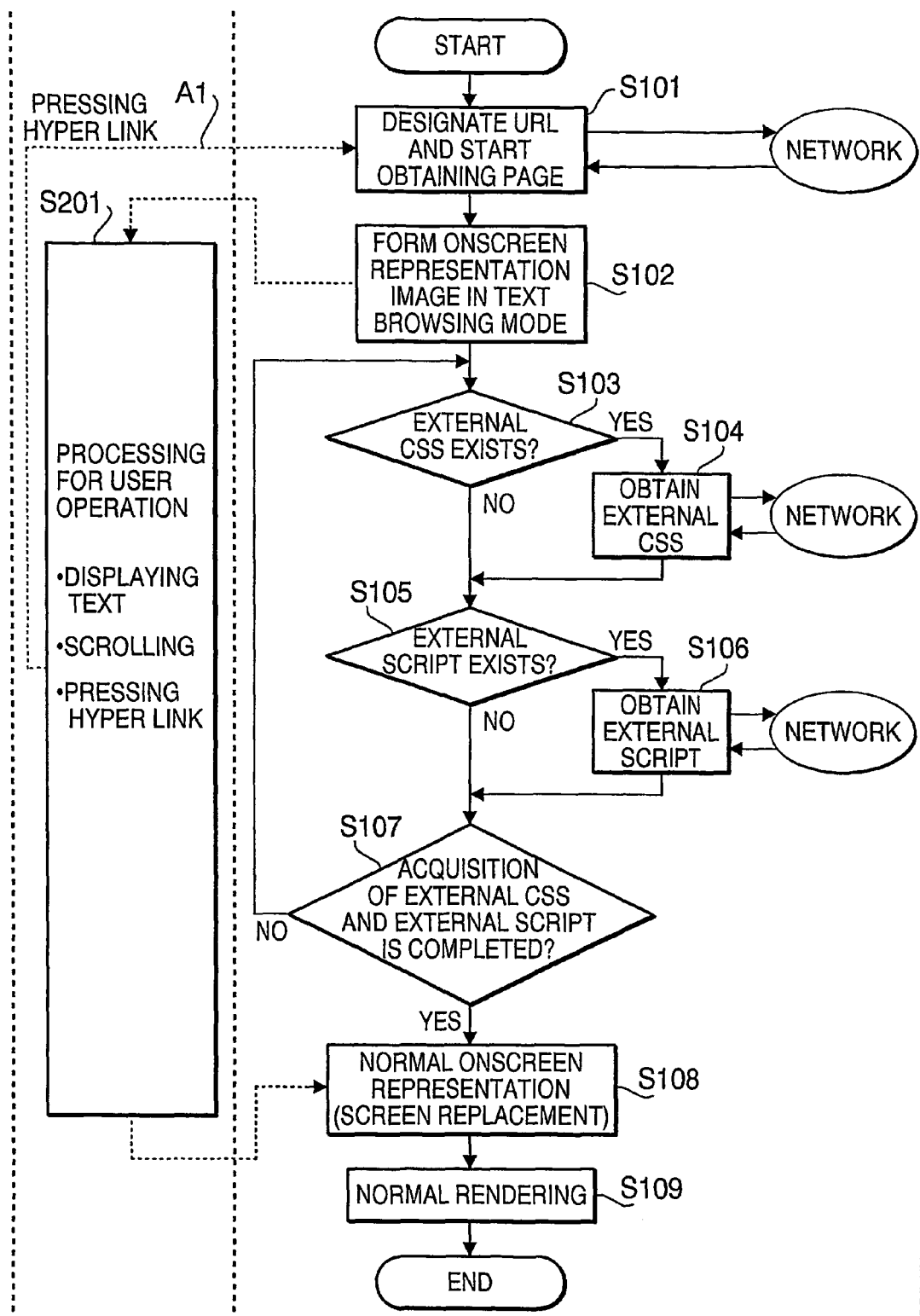
FIG. 2 is a flowchart illustrating a rendering process of a browser running on the terminal device.

In the ROM 5, various programs including a browser are stored. When a user conducts predetermined operation using the user interface device 17, the browse is started. FIG. 2 is a flowchart illustrating a rendering process of the browser running on the terminal device 10. The browser has a parser, a page maker, and a formatter as essential functional blocks. These functional blocks execute the following processes on the markup language document. The parser parses a logical structure of the markup language document. The page maker generates a layout tree containing information regarding a form of representation defined by each tag. The formatter performs layout operation using information regarding an actual screen such as a screen width. In the rendering process shown in FIG. 2, functions accomplished by the functional blocks are utilized. As shown in FIG. 2, the browser firstly starts to obtain an HTML document of a web page, of which URL (uniform resource locator) is designated by a user, through a network (S101).

Next, in step S102, displaying operation based on the text browsing mode is started. Specifically, in step S102, parsing operation for the HTML document is performed, and thereafter laying out operation for a result of the parsing operation is performed to display onscreen representation based on the text browsing mode. Next, a process for user operation operated on the screen image of the text browsing mode (S201) is performed in parallel with a sequence of processes (S103 through S107) for obtaining data through the network.

In step S201, obtained parts of the HTML document in obtaining process started in step S101 are displayed successively on a screen of the display 13. Further, in step S201, user operation such as anchor selection (pressing of a hyper link) and scrolling operation is accepted and processed. For example, if the user selects one of hyper links on the screen image of the text browsing mode in step S201, control returns to step S101 to start obtaining a selected page (as indicated by an arrow A1 in FIG. 2).

In the sequence of processes of step S103 through S107, the presence or absence of the external data (e.g., an external CSS and an external script) is judged in accordance with the result of the parsing operation of the HTML document. Specifically, in step S103, it is judged whether an external CSS is designated in the HTML document. When the designation of the external CSS is included in the HTML document (S103: YES), control proceeds to step S104 where the external CSS is obtained through the network. After the data acquisition in step S104 is finished, control proceeds to step S105. When the designation of the external CSS is not included in the HTML document (S103:NO), control proceeds to step S105.

In step S105, it is judged whether an external script is designated in the HTML document. When the designation of the external script is included in the HTML document (S105: YES), control proceeds to step S106 where the external script is obtained through the network. After the data acquisition in step S106 is finished, control proceeds to step S107. When the designation of the external script is not included in the HTML document (S105:NO), control proceeds to step S107.

In step S107, it is judged whether or not the data acquisition of the external CSS and the external script designated in the HTML document under processing is completed. When the data acquisition is not completed (S107:NO), control returns to S103 to repeat the data acquisition. When the data acquisition is completed (S107:YES), control proceeds to step S108.

In step S108, onscreen representation applying the external CSS and the external script is created and displayed on the screen. Hereafter, onscreen representation displayed in step S108 in a manner designated by a markup language (e.g. HTML) of the page is referred to as normal onscreen representation. Specifically, in step S108, the laying out process for the obtained page is performed, applying the obtained external CSS and the external script. Then, onscreen representation of the normal onscreen representation is formed and displayed on the screen. That is, the onscreen representation of the text browsing mode is replaced by the normal onscreen representation.

By initiation of the screen replacement of step S108, the text browsing mode is finished. In step S109, rendering operation for newly obtained parts of the HTML document may be conducted to complete rendering of the overall page. After the rendering in step S109 is finished, the rendering process is terminated.

As can be seen from FIG. 2, firstly the page requested by the user is displayed in the text browsing mode, and then the normal onscreen representation of the requested page is provided when the external data is successfully obtained through the network. In other words, according to the rendering process shown in FIG. 2, the onscreen representation in the text browsing mode is provided for the user until the normal onscreen representation becomes available. It should be noted that, according to the embodiment, onscreen representation (e.g., a so-called wall paper) having no relation with a requested page is not displayed on the screen until the completion of acquisition of the external data. Also, it is noted that onscreen representation in the text browsing mode and the normal onscreen representation are formed by the same HTML document by the browser.

According to the rendering process of the embodiment, the onscreen representation in the text browsing mode is provided for the user immediately at a time of initiation of acquisition of the requested page. This means that the user can start browsing of a requested URL quickly after designation of the URL through the user interface device 17. Therefore, the rendering process of the embodiment allows the user to quickly grasp a general outline of the requested page's contents firstly and to secondly transfer to another page by anchor selection if the user wants to browse another page after glancing over the onscreen representation of the text browsing mode of the requested page.

After the user enjoys browsing the screen image of the requested page in the text browsing mode for a while, the normal onscreen representation is provided for the user. In the following explanation, the external data is frequently represented by only the external CSS; however, it is understood that the term external CSS used to represent the external data may be replaced with the external script. Moreover, CSS is just one example of style sheet.

It is understood from the explanation of the rendering process mentioned above, perceptible processing rate for rendering a web page can be enhanced in comparison with a conventional browser while deterioration of image quality is not caused.

Figure 3A:
FIG. 3A is a screen image of a web page in a text browsing mode displayed on a screen of the terminal device by the rendering process shown in FIG. 2.
Figure 3B:
FIG. 3B is a screen image of the normal onscreen representation of the web page displayed on the screen of the terminal device by the rendering process shown in FIG. 2.
Figure 4:
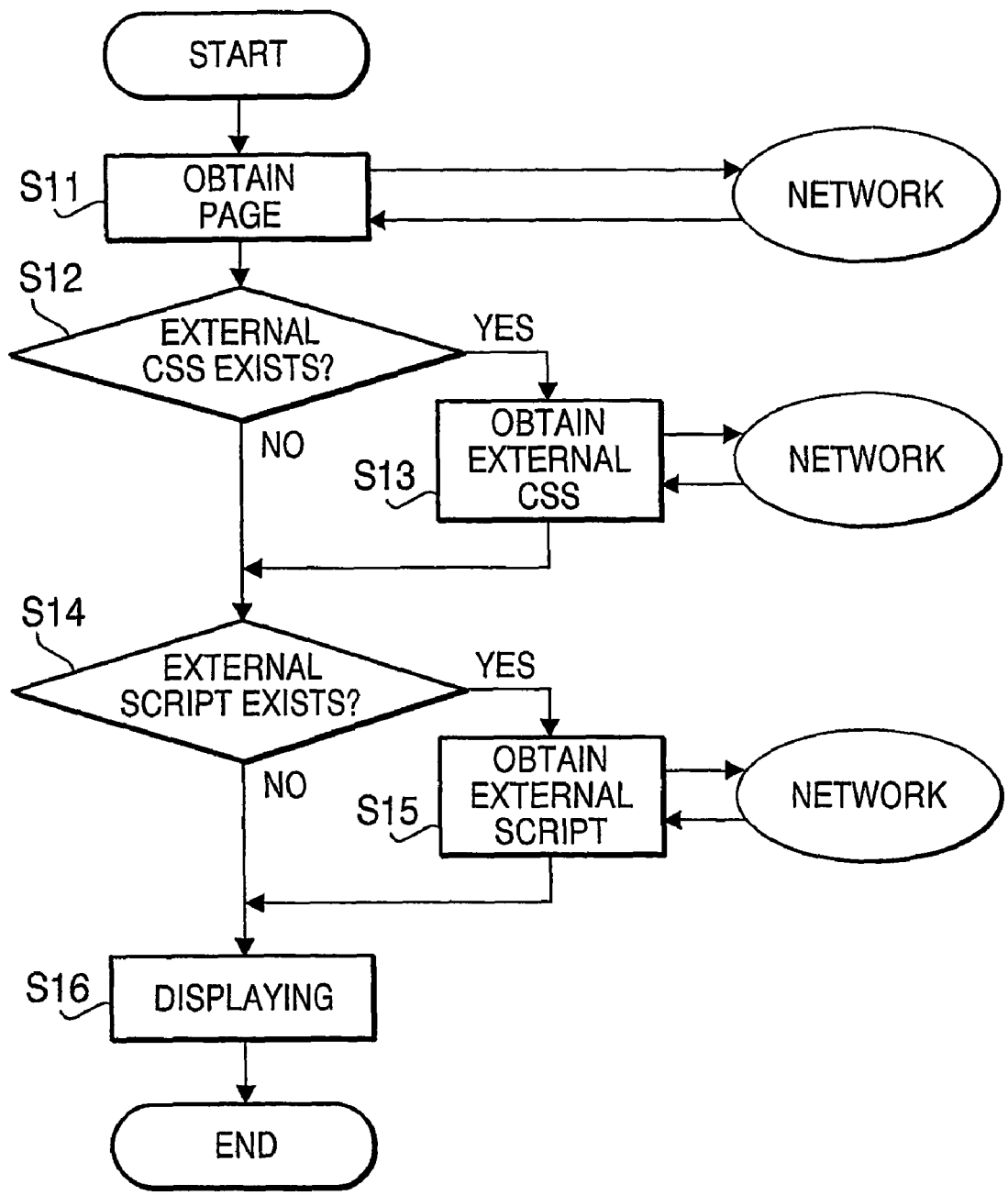
FIG. 4 is a flowchart illustrating a rendering process of a conventional browser running on a personal computer.

FIGS. 3A and 3B are examples of screen images displayed on the screen (display 13) by the rendering process shown in FIG. 2. FIG. 3A is a screen image of a web page made in the text browsing mode (at step S201). FIG. 3B is a screen image as the normal onscreen representation of the same web page made in step S108. That is, the screen image in the text browsing mode in FIG. 3A and the screen image of the normal onscreen representation in FIG. 3B are made based on the same web page.

The user can grasp a general outline of the web page viewing the screen image shown in FIG. 3A. Then, the normal onscreen representation shown in FIG. 3B is provided for the user after acquisition of the external data.

In the rendering process shown in FIG. 2, the switching from the indication of the text browsing mode to the normal onscreen representation (hereafter, frequently referred to as representation switching) is made according to whether the external data is completely obtained through the network. That is a criterion "whether or not the external data is completely obtained" is used to decide whether or not to perform the representation switching. As an alternative to such a criterion, one of criteria indicated below may be adopted.

(1) whether or not N (N: a positive integer) screenfuls of data is obtained.
(2) whether or not a predetermined time has elapsed.
(3) whether or not predetermined user operation is performed.
(4) whether or not data of the entire web page is obtained.

The criterion (1) "whether or not N (N: a positive integer) screenfuls of data is obtained" will be explained in detail. If the criterion (1) is adopted in the rendering process shown in FIG. 2, it is judged in step S107 whether N screenfuls of data is completely obtained or not. It is noted that one screen size is a size of the screen of display 13. When it is determined that the N screenfuls of data is obtained (S107:YES), the representation switching is performed in step S108.

Preferably, the number N is two. That is, it is preferable that the representation switching is made when two screenfuls of data of a designated page is obtained through the network. When the number N is two, even if data such as a table, which is described using a <table> tag, having a size more than several screens long is contained in a page, the representation switching is made when two screenfuls of data is acquired without waiting until data of the entire page is acquired through the network.

It should be noted that the size of two screenfuls of data is sufficient and appropriate size for the purpose of user operation such as anchor selection and scrolling. The number N may be a decimal number. For example, the number N may be 2.5.

The criterion (2) "whether or not a predetermined time has elapsed" will be explained in detail. If the criterion (2) is adopted in the rendering process shown in FIG. 2, it is judged in step S107 whether the predetermined time has elapsed from the start of acquisition of the page data in step S101. When it is determined that the predetermined time has elapsed (S107:YES), the representation switching is performed in step S108.

The predetermined time may be a time period required typically to obtain the external data, or a time period required typically for a user to grasp a general outline of a page in the text browsing mode.

The criterion (3) "whether or not predetermined user operation is performed" will be explained in detail. If the criterion (3) is adopted in the rendering process shown in FIG. 2, whether or not to switch from the text browsing mode to the normal onscreen representation depends on a user's intention. That is, in this case, it is judged in step S107 whether or not predetermined user operation (using the user interface device 17) is performed.

Only when it is determined that the predetermined user operation is performed, the onscreen representation of the text browsing mode is switched to the normal onscreen representation. It is understood that use of the criterion (3) allows a user to switch to the normal onscreen representation only when the user wants to see detailed information (i.e., the normal onscreen representation) of a page after the user brows the onscreen representation of the text browsing mode which is initiated immediately after designation of a URL of the page.

The criterion (4) "whether or not data of the entire web page is obtained" will be explained in detail. If the criterion (4) is adopted in the rendering process shown in FIG. 2, it is judged in step S107 whether or not data of the entire page is obtained. When it is determined that data of the entire page is obtained (S107:YES), the representation switching is performed in step S108.

The above mentioned operation of the browser (i.e., the rendering process) according to the embodiment can be expressed as providing onscreen representation of the text browsing mode firstly and thereafter providing the normal onscreen representation. That is, in the rendering process described above, onscreen representation of the text browsing mode in which external data is not applied is firstly provided before providing the normal onscreen representation. However, onscreen representation provided before providing the normal onscreen representation is not limited to such onscreen representation of the text browsing mode defined above.

For example, onscreen representation applying only an external CSS may be provided before providing the normal onscreen representation in which all of types of external data is applied. In other words, the operation of the rendering process according to the embodiment can be expressed as providing firstly onscreen representation, which is less rich in presentation than the normal onscreen representation but can be provided in a relatively short time, and thereafter providing the normal onscreen representation which requires a relatively long time to display but is rich in presentation.

Further, in the rendering process shown in FIG. 2, the representation switching is made in two steps (i.e., a step of the text browsing mode and a step of the normal onscreen representation). However, the representation switching may be made in three or more steps. For example, the representation switching may be made so that presentation of a page becomes richer in three steps.

As can be seen from the above explanation, presentation of a page can be broadly divided into the normal onscreen representation and a less rich onscreen representation (i.e., onscreen representation less rich than the normal onscreen representation) according to whether or not external data (including external image data, external motion picture data, an external style sheet and an external script) is applied. The text browsing mode is included in the less rich onscreen representation.

Hereafter, a browsing mode for the less rich onscreen representation is referred to as "a poor browsing mode", and a browsing mode for the normal onscreen representation is referred to as "a full browsing mode". The poor browsing mode and the full browsing mode are defined as follows.

(1) The poor browsing mode includes the following modes M1 and M2.

(Mode M1) the text browsing mode: in this mode displaying on a screen is performed based on text information of a page without applying an external style sheet and an external script designated in the page as defined above. The user operation such as anchor selection and scrolling is also possible in the text browsing mode. If style sheet data is stored locally in a memory (e.g., the ROM 5) of the terminal device 10 beforehand, such style sheet data may be applied to onscreen representation in the text browsing mode.

(Mode M2) a local image and motion picture browsing mode: in this mode an external style sheet and an external script are not applied for text information of a page, but image data and/or motion picture data stored locally in the terminal device 10 are used for onscreen representation. The user operation such as an anchor selection and scrolling is also possible in the mode M2. The locally stored data (image data or motion picture data) includes data stored in a cache memory of the terminal device 10. The locally stored data includes an alternative icon data, stored in the terminal device 10, which is displayed on the screen image in place of an image to be obtained through the network.

As described above, the poor browsing mode is a browsing mode in which an external style sheet and an external script are not applied, and objects (including image data and motion picture data) to be obtained from the network are not displayed. A browsing mode combining the modes M1 and M2 may be categorized as the poor browsing mode.

The full browsing mode is a browsing mode in which at least an external style sheet and an external script are applied to onscreen representation. That is, substantially complete presentation of a page is attained in this mode.

The representation switching may be made such that presentation of a page becomes richer through the text browsing mode M1, the browsing mode M2 and the full browsing mode.

Hereafter, examples of the representation switching operation based on the criterion (3) described above will be explained. Operation of the following examples relate to changing from a poor browsing mode (including the text browsing mode) to a full browsing mode (including/equal to normal onscreen representation) depending on a user's intention.

Before explaining the representation switching operation based on the criterion (3), examples of onscreen representation made by the representation switching operation in which the representation switching is made automatically (depending on whether or not the external data is completely obtained) will be explained with reference to FIGS. 5A and 5B.

Figure 5A:
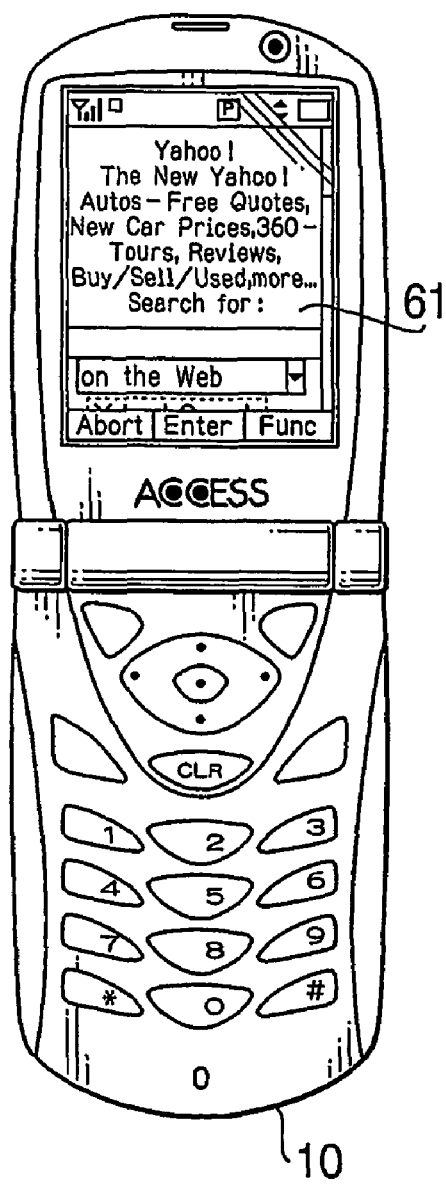
FIG. 5A shows an example of a screen image in the text browsing mode.
Figure 5B:
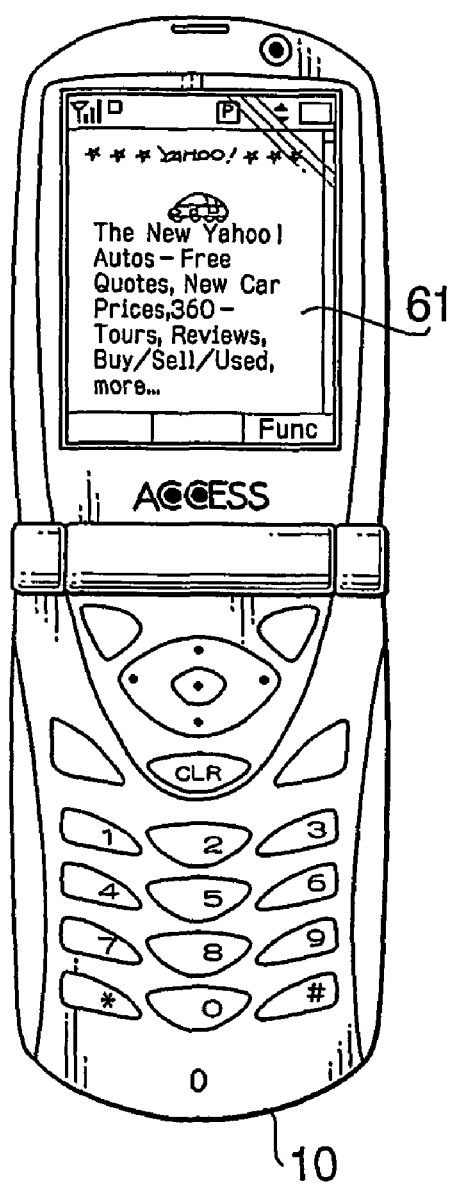
FIG. 5B shows an example of a screen image in the full browsing mode made.

FIG. 5A shows an example of a screen image in the text browsing mode. As shown in FIG. 5A, the screen image is formed on a screen 61 of the terminal device 10 based on the text browsing mode. FIG. 5B shows an example of a screen image in the full browsing mode made. The screen image of FIG. 5B is made automatically when the external data is completely obtained in step S108 in FIG. 2.

Figures 6A, 6B, 6C:
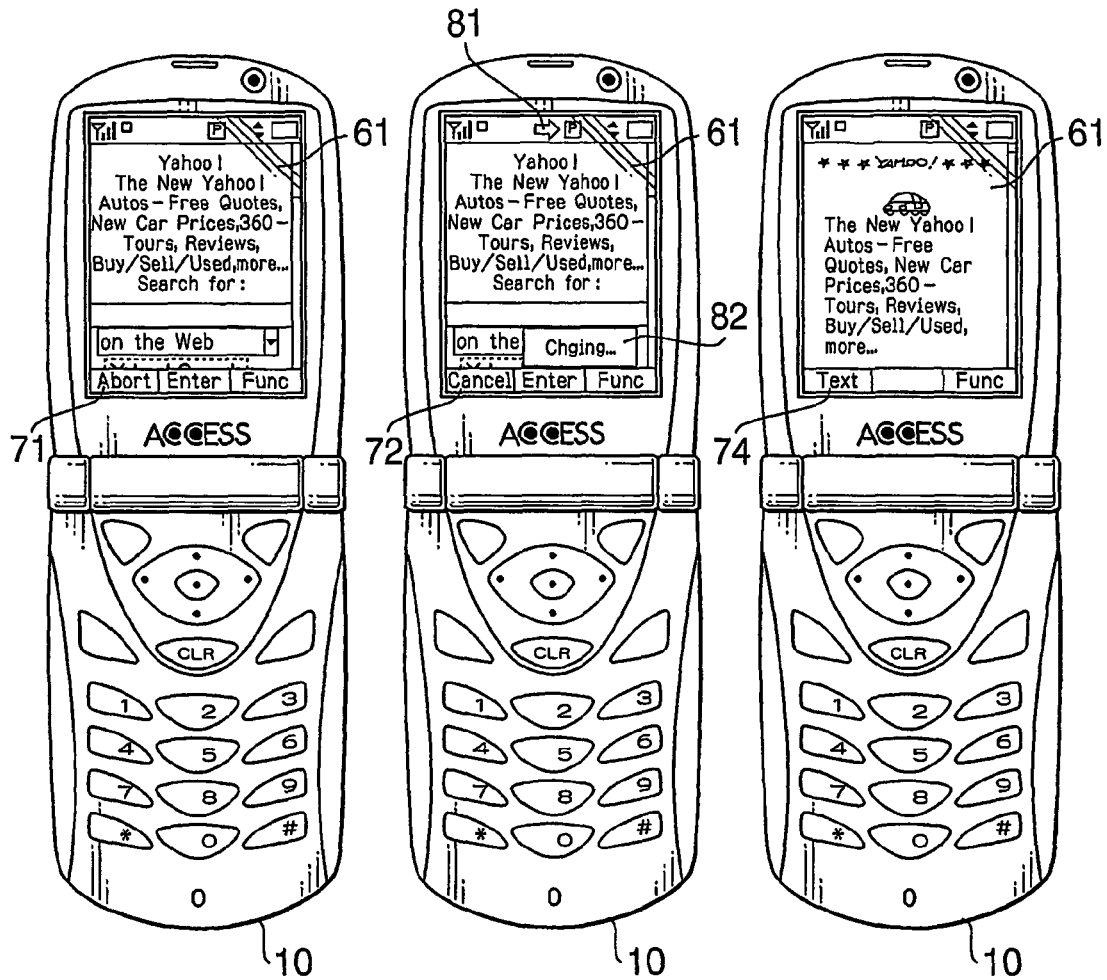
FIG. 6A shows a screen image which is displayed on the screen of the terminal device in a stage of a start of the text browsing mode.
FIG. 6B shows a screen image at a stage in which text data in the page is completely obtained and notification notifying that the terminal device is ready for changing to the full browsing mode is also displayed on the screen.
FIG. 6C shows a screen image at a stage in which a browsing mode has been changed from the text browsing mode to the full browsing mode.

FIGS. 6A through 6C are examples of screen images formed by the representation switching operation in which the representation switching is performed depending on the user's operation based on his intention. Hereafter, the representation switching operation, which is explained below with reference to FIGS. 6A through 6C, is referred to as "user selection switching operation #1".

In the user selection switching operation #1, the representation switching from the text browsing mode to the full browsing mode is performed automatically upon completion of acquisition of the external data if user operation for canceling the representation switching to the full browsing mode is not made by the user. Specifically, in this operation #1, notification notifying that the terminal device 10 is ready for changing to the full browsing mode is displayed on the screen 61 before the representation switching is performed.

That is, in this operation #1, the representation switching to the full browsing mode is automatically made upon completion of acquisition of the external data, but a chance for canceling the representation switching is provided for the user at a stage before execution of the representation switching. The operation #1 has advantages in that it provides a chance for canceling the representation switching to a user who thinks the onscreen representation of the text browsing mode is sufficient.

FIGS. 6A through 6C are screen images in the user selection switching operation #1. FIG. 6A shows a screen image which is displayed on the screen 61 of the terminal device 10 in a stage of a start of the text browsing mode. At the stage of FIG. 6A, text data of a page is not completely obtained. In this stage, an "Abort" key 71 assigned as a software key is displayed on the screen 61.

FIG. 6B shows a screen image at a stage in which all of the text data in the page is obtained and the notification notifying that the terminal device 10 is ready for changing to the full browsing mode is also displayed on the screen 61. This stage also allows the user to cancel the changing from the text browsing mode to the full browsing mode. In the stage shown in FIG. 6B, the screen image is still in the text browsing mode.

Specifically, in the stage shown in FIG. 6B, a cancel key 72 assigned as the software key is displayed on the screen 61. The cancel key 72 is used to cancel changing from the text browsing mode to the full browsing mode (i.e., the representation switching). That is, if the user operates the cancel key 72, the changing from the text browsing mode to the full browsing mode is cancelled. Therefore, by operating the cancel key 72, the user can continue to brows in the text browsing mode.

As shown in FIG. 6B, notification notifying that the terminal device 10 is ready for changing to the full browsing mode is also displayed on the screen 61. In the example of FIG. 6B, two types of notification (i.e., an arrow symbol 81 and indication "changing . . . " 82) are displayed.

FIG. 6C shows a screen image at a stage in which the browsing mode has been changed from the text browsing mode to the full browsing mode. In the stage of FIG. 6C, the screen image is formed in accordance with the full browsing mode.

As described above, the user selection switching operation #1 is performed through three phases (i.e., three stages of FIGS. 6A, 6B and 6C). FIG. 7 is a timing chart illustrating a progress of the user selection switching operation #1, in which the stages of FIGS. 6A, 6B and 6C are defined as phases P1, P2 and P3, respectively. Also, in FIG. 7, corresponding of each browsing (phase), each condition of data acquisition, and each software key assigned is shown.

Referring to FIGS. 2 and 7, the phases P1, P2 and P3 can be defined as follows.

Phase P1: This phase corresponds to a stage from the start of acquisition of data of a page at step S101 to completion of acquisition of text data of the page.

Phase P2: This phase corresponds to a stage from the completion of acquisition of the text data of the page to completion of acquisition of external data of the page at step S107.

Phase P3: This phase corresponds to a stage from the normal onscreen representation at step S108.

Therefore, the phases P1 and P2 correspond to operation of the browser in the text browsing mode. The phase P3 corresponds to operation of the browser in the full browsing mode. A timing t1 at which the phase P1 is switched to the phase P2 corresponds to a timing at which the acquisition of the text data of the page is completed. A timing t2 at which the phase P2 is switched to the phase P3 corresponds to a timing at which acquisition of the external data of the page is completed.

In the phase P1, acquisition of the text data of the page aborts when the abort key 71 assigned as the software key is operated by the user. In phase P2, the cancel key 72 is assigned as the software key on the screen 61 in place of the abort key 71. As described above, in the phase P2, the user can cancel the representation switching to the full browsing mode by operating the cancel key 72.

It is understood that the indication of the cancel key 72 on the screen 61 in the phase P2 serves the purpose of letting the user know that the representation switching occurs in a short time. As described above, the arrow symbol 81 and the indication "changing . . . "82 are also displayed on the screen 61, by which the fact that the representation switching occurs in a short time is notified to the user securely.

As shown in FIGS. 6C and 7, in the phase P3, a "text" key 74 may be assigned as the software key. The text key 74 is used to return to the text browsing mode from the full browsing mode.

Since the canceling of the representation switching is allowed in the phase P2 (i.e., before entering the full browsing mode), the amount of data to be stored in the terminal device 10 can be reduced when the user selects the canceling of the representation switching.

A progressive bar (not shown in FIGS. 6A through 6C) may be displayed on the screen 61 to show the progress of the user selection switching operation #1. FIGS. 8A through 8C show examples of progressive bars to be displayed on the screen 61. Specifically, a progressive bar 91 in FIG. 8A shows a situation in which the operation #1 is in the phase P1. The length of the progressive bar increases with the progress of the operation #1 as shown in FIGS. 8B and 8C. A progressive bar 92 in FIG. 8B shows a situation in which the operation #1 is at the midpoint of the phase P2, and a progressive bar in FIG. 8C shows a situation in which the operation #1 is at the tail end of the phase P2.

A color of the progressive bar may be changed between the phase P1 and the phase P2. In the examples of FIGS. 8A through 8C, the progressive bar 91 in the phase P1 is displayed in a first color (or a first hatching pattern), and the progressive bar 92 (and 93) in the phase P2 is displayed in a second color (or a second hatching pattern) different from the first color (the first hatching pattern), by which the user can securely recognize a change of the phase.

Variations of the user selection switching operation #1 can be made as follows. Hereafter, five variations A1 through A5 of the user selection switching operation #1 will be described.

[Variation A1]

In the variation A1, the indication "changing . . . " 82 flashes after the acquisition of the external data is completed. The operation of the cancel key 72 is allowed for a predetermined time period from the completion of the acquisition of the external data (i.e., from the timing t2). After the predetermined time period has elapsed from the completion of the acquisition of the external data, the representation switching to the full browsing mode is performed automatically unless the user operation of the cancel key 72 is done by the user.

The cancellation of the representation switching may be inhibited in the phase P2. Preferably, in this case, the indication "changing . . . " 82 is not displayed on the screen 61 in the phase P2, and the indication "changing . . . " 82 is only displayed (i.e., blinked) in the above mentioned predetermined time period from the timing t2.

Alternatively, the cancellation of the representation switching may be also allowed in the phase P2. Preferably, in this case, the indication "changing . . . " 82 is also displayed on the screen 61 in the phase P2.

Figure 11:
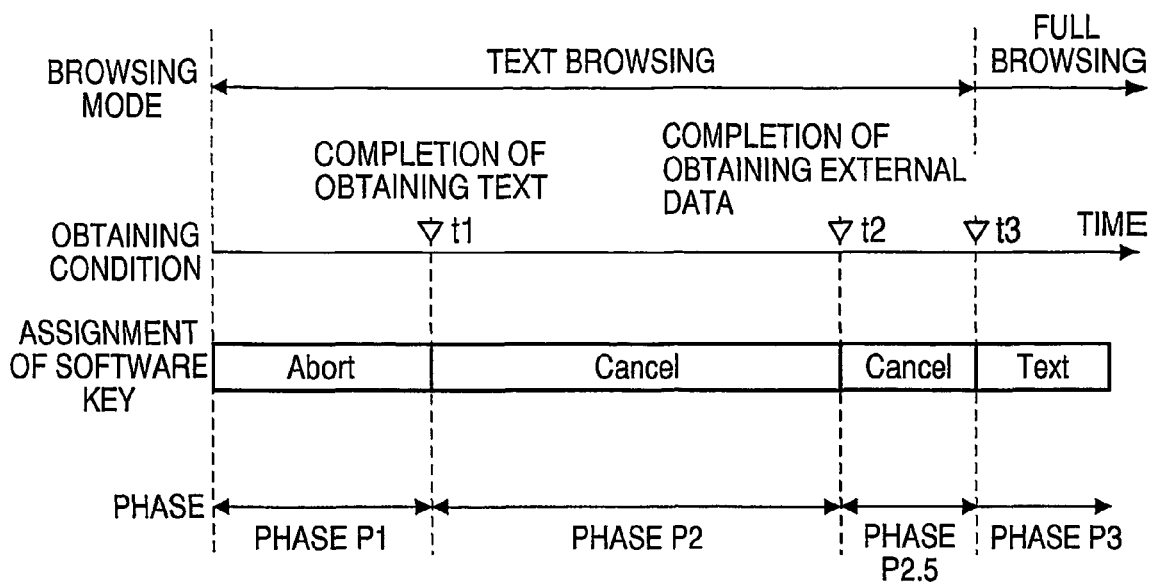
FIG. 11 is a timing chart illustrating progress of a variation of the user selection switching operation #1.

FIG. 11 is a timing chart illustrating progress of the variation A1, in which the stages of FIGS. 6A, 6B and 6C are defined as phases P1, P2 and P3, respectively. Similarly to FIG. 7, in FIG. 11, the browsing mode, the condition of data acquisition, and assigning of the software key are also shown.

As shown in FIG. 11, in the variation A1, the indication "changing . . . " 82 flashes for the predetermined time period (e.g., two seconds) from the completion of acquisition of the external data (i.e., from the timing t2) to accept the cancellation of the representation switching. In FIG. 11, a phase during the predetermined time period is defined as a phase P2.5. In phase P2.5, the screen image based on the text browsing mode is displayed on the screen 61.

After a lapse of the predetermined time period (i.e., at a timing t3), the representation switching is performed to enter the phase P3. The variation A1 is very convenient for a user because the variation A1 allows the user to securely cancel the representation switching, for example, when the user finds a desired link on the screen image of the text browsing mode immediately before the changing from the text browsing mode to the full browsing mode. The variation A1 may operate in the phase P2.5 so that the arrow symbol 81 also flashes together with the flashing of the indication "changing . . . " 82. Alternatively, the variation A1 may operate so that only the arrow symbol 81 flashes.

[Variation A2]

In the variation A2, the canceling of the representation switching is allowed in the whole span of the phase P2 as in the case of the user selection switching operation #1 shown in FIG. 7, and the indication "changing . . . " 82 is displayed on the screen 61 only for a certain time period immediately before the timing of the completion of acquisition of the external data (i.e., the timing t2). For example, the indication "changing . . . " 82 may be displayed in the phase P2 in a range of the progress of the external data acquisition of about 95% to 100%.

By the configuration of the variation A2, it becomes possible to securely notify the user of the change of the browsing mode.

[Variation A3]

In this variation A3, the indication "changing . . . " 82 is displayed from a timing immediately before the completion of the external data acquisition (i.e., the timing t2) to a timing immediately after the timing t2. That is, a time period allowing the canceling of the representation switching is started at the timing immediately before the completion of the external data acquisition, and continues for a while from the completion of the external data acquisition.

[Variation A4]

In the variation A4, a key (e.g. a "change" key) is displayed on the screen 61 as a software key after the user operates the cancel key 72 to cancel the representation switching to the full browsing mode. The "change" key is used to instruct the browser to change to the full browsing mode. The variation A4 may be additionally performed together with, for example, each of the variations A1, A2 and A3.

[Variation A5]

In the variation A5, the abort key 71 is displayed on the screen 71 until the completion of the external data acquisition (i.e., until the timing t2), and the cancel key 72 is not displayed. That is, operation of the abort key 71 is accepted until the timing t2. By the abort key 71, acquisition of text data of a page is stopped.

The variation A5 may be used in combination with the variation A1. In such a case, the abort of the acquisition of the text data is accepted until the timing t2, and the indication "changing . . . " 82 flashes for the predetermined time (i.e., two seconds) from the timing t2 to accept the canceling of the representation switching.

In the example of the screen image in FIG. 6B, the letters "Cancel" are displayed as the cancel key 72. However, letters "Text" may be displayed as the cancel key 72 in place of the letters "Cancel" since the cancel key 72 has the function of continuing the text browsing mode.

It should be noted that the progressive bars of FIGS. 8A through 8C are shown by way of illustration. Various types of presentations of progressive bars for notifying the user of progress of the phase and progress of data acquisition are also possible. FIG. 9 shows one of such variations of presentation of the progressive bar. In the example of FIG. 9, the progressive bar has a plurality of portions having different colors respectively corresponding to a plurality of phases. That is, in the example of FIG. 9, the progressive bar is formed by two portions having different colors respectively corresponding to the phases P1 and P2.

As an alternative to displaying the progressive bar, an icon may be displayed on the screen 61 to indicate progress of the phase by, for example, rotation of the icon or switching of color of the icon.

With regard to the variation A1, the progressive bar described above may be displayed on the screen 61 during the phase P2 and the phase P2.5 in which the indication "changing . . . " 82 flashes. In this case, the progressive bar may be displayed such that a color (or a hatching pattern) of a part of the progressive bar corresponding to the phase P2.5 is changed from a color (or a hatching pattern) of a part of the progressive bar corresponding to the phase P2.

Figures 10A, 10B, 10C:
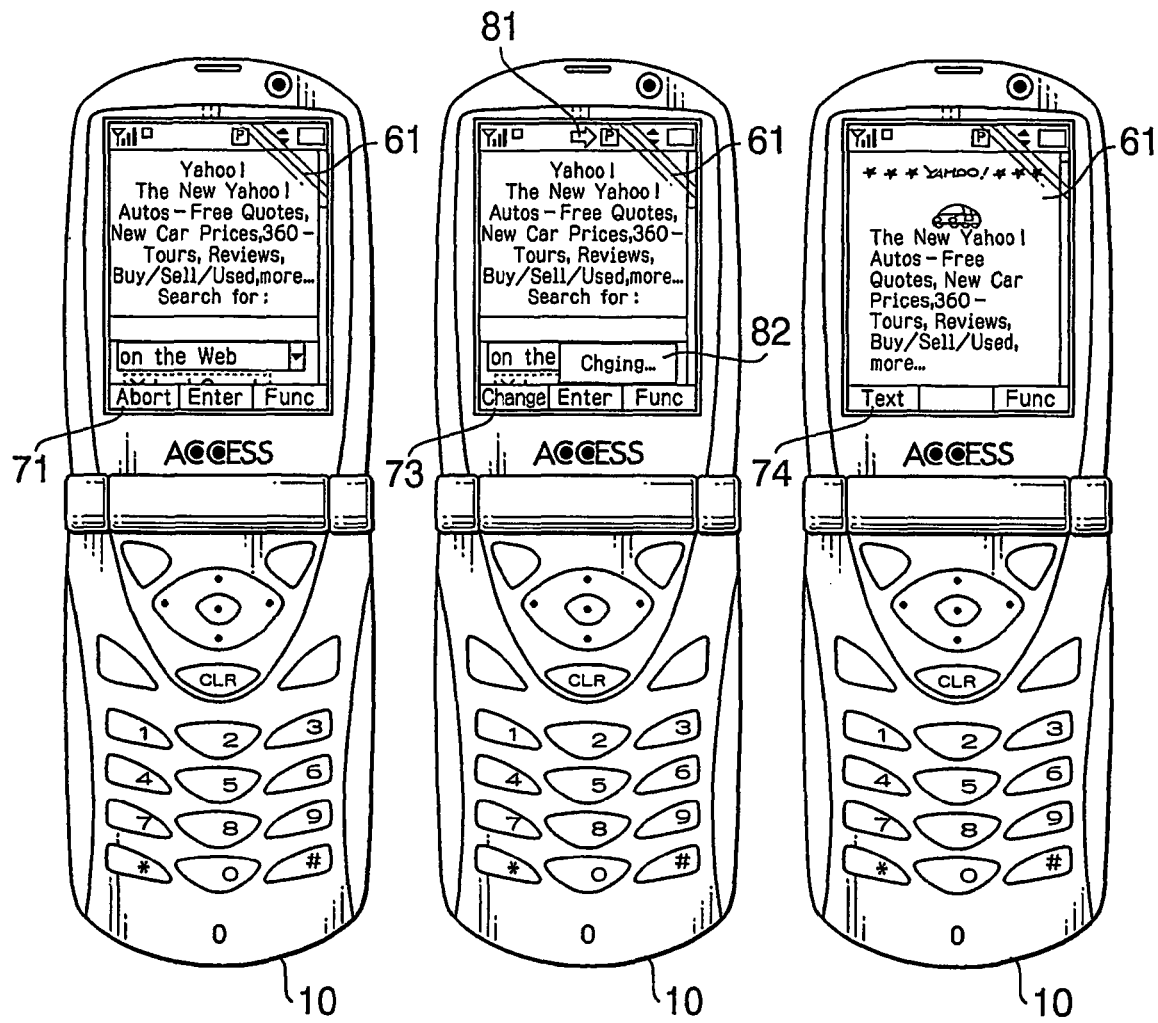
FIG. 10A shows a screen image in the first phase in user selection switching operation #2.
FIG. 10B shows a screen image at a stage in which text data of a page is completely obtained and notification notifying that screen switching to the full browsing mode will become possible within a short time is displayed on the screen.
FIG. 10C shows a screen image in a situation in which the screen switching to the full browsing mode has been performed.

FIG. 10A through 10C are other examples of screen images made by the representation switching operation performed depending on the user's operation based on his intention. The representation switching operation explain below with reference to FIGS. 10A through 10C is referred to as "user selection switching operation #2".

In the user selection switching operation #2, the notification notifying the user that the browser is ready for performing the representation switching is displayed on the screen 61, but the representation switching is not performed (i.e., the text browsing mode is not changed to the full browsing mode) if the user's command is not inputted to the terminal device 10.

Similarly to the user selection switching operation #1 shown in FIGS. 6A through 6C, FIG. 10A shows a screen image in the phase P1. In the stage of FIG. 10A, the onscreen representation in the text browsing mode is formed on the screen 61. In this stage of FIG. 10A, text data of a page is not completely obtained. In this stage, the "Abort" key 71 assigned as a software key is displayed on the screen 61 to allow the user to abort the acquisition of text data of the page.

FIG. 10B shows a screen image at a stage in which the text data of the page is completely obtained and the notification notifying that the representation switching to the full browsing mode will become possible within a short time (or the notification notifying that the representation switching has become possible) is displayed on the screen 61. Also, on the screen 61, an operation key (e.g., a software key) which allows the user to switch to the full browsing mode is displayed.

As described above, if the user makes no operation in the phase P2 (on the screen 61 of FIG. 10B), the representation switching from the text browsing mode to the full screen mode is not performed. Specifically, in the phase P2, a "Change" key 73 is displayed as a software key (see FIG. 10B). The "Change" key 73 is used to instruct the browser (the terminal device 10) to change to the full browsing mode. If the "Change" key 73 is not operated, the representation switching to the full browsing mode is not performed. The arrow symbol 81 and the indication "changing . . . " 82 function as the notification notifying that the representation switching to the full browsing mode will become possible within a short time.

FIG. 10C shows a screen image in a situation in which the representation switching to the full browsing mode has been performed. That is, FIG. 10C is the screen image in the full browsing mode after the user operates the "Change" key 73.

As a variation, the user selection switching operation #2 may be configured such that the representation switching by the "Change" key 73 is allowed at any desired time after the external data is completely obtained. This configuration is convenient for the user particularly in a situation in which the user wants to change the browsing mode to the full browsing mode after browsing the page in the text browsing mode for a while.

Alternatively, the "Change" key 73 may be displayed on the screen 61 for a predetermined time period from completion of acquisition of the external data. In this case, the user can not change the browsing mode to the full browsing mode if the user does not press the "Change" key 73 within the predetermined time period. Another operation key may be assigned as a software key to allow the user to instruct the browser to change to the full browsing mode.

In each of the user selection switching operation #1 and the user selection switching operation #2, a software key for returning to the text browsing mode may be provided after the representation switching to the full browsing mode is made. Such a software key may be a "Text" key 74 as shown in FIGS. 6C and 10C.

As described above, in the user selection switching operation #1 shown in FIGS. 6A through 6C, the representation switching from the text browsing mode to the full screen mode is cancelled by the operation of the cancel key 72. As an alternative to such a configuration, the canceling of the representation switching may be made when predetermined operation such as scrolling operation, storing operation or printing operation is conducted by the user in the text browsing mode because such predetermined operation made during the text browsing mode can be considered as action indicating that the user does not want the representation switching from the text browsing mode to the full browsing mode.

Alternatively, if the predetermined operation such as scrolling operation, storing operation or printing operation is conducted by the user in the text browsing mode, accepting of the canceling of the representation switching (i.e., to make the indication "changing . . . " 82 flash at the timing in the vicinity of the completion of the external data acquisition as in the case of the variations A1 and A2) may be extended. For example, the allowing of the canceling of the representation switching may be extended until the predetermined operation by the user is finished.

It is noted that, in each of the user selection switching operation #1 and the user selection switching operation #2, a user interface for inputting a command about whether or not to change the browsing mode is not a modal dialog such as a dialog box. That is, the user interface according to the embodiment is not a dialog box which disenables operation other than operation for the dialog box. Therefore, according to the embodiment, the user operation for selecting or canceling the mode switching is very simple for the user. Consequently, usability in browsing web pages can be enhanced.

In addition to the above mentioned configuration of the browser (i.e., the rendering process), the browser may have the function of recovering a focus position and/or a scroll position as described below. Hereafter, the function of recovering the focus position and the scroll position of the browser provided at the timing of the representation switching is explained.

In the text browsing operation (e.g., in the screen image shown in FIG. 5A) or in the full browsing operation (e.g., in the screen image shown in FIG. 5B), a focus (a cursor indicating the user's present attention in the page) is located on one of anchor selection targets and objects to be targeted for sending operation, storing operation, printing operation and the like. The user moves or selects the focus by use of the user interface device 17 so as to conduct anchor selection of a link or to start data transmission.

The browser controls the focus position and the scroll position by relating these positions to data of the text browsing mode or data of the full browsing mode. The browser stores the focus position (i.e., a focus target on which the focus is to be located) and the scroll position by relating these positions to an HTML document. The scroll position is a reference position of scrolling that defines a displaying area in the page. Examples of the scroll position stored in the terminal device 10 are the top position, the midpoint position or the bottom position corresponding to the HTML document.

More specifically, the browser stores the focus position or the scroll position, for example, as the number of bytes from the top of the HTML document, or the number of bytes from the top position of the HTML document, so that the focus position and the scroll position are related to the HTML document. When the browsing mode is switched from the text browsing mode to the full browsing mode, the browser stores the focus position and the scroll position of the onscreen representation in the text browsing mode, and restores the focus position and the scroll position on the onscreen representation of the full browsing mode based on the stored information which is related to HTML document. That is, the browser determines an object to be assigned the focus and the scroll position based on the stored information, and then forms onscreen representation to be displayed within the displaying area. As the onscreen representation in the text (poor) browsing mode and the normal onscreen representation in the full browsing mode are formed by the same HTML document, referring the stored position of focus and/or the stored scroll corresponding to the HTML document enables to restore the focus position and scroll position, which a user selected in the text browsing mode, in the onscreen representation in the full browsing mode.

If the focus target is not included in the displaying area defined by the scroll position, the screen image may be formed to include the focus position (i.e., the focus position may have higher priority than the scroll position in regard to the formation of a screen image based on the stored information). For example, the scroll position may be adjusted so that the focus position is located at the center of the displaying area.

Preferably, the scroll position may be adjusted so that a scrolling amount from the top of a page is minimized and a focus target is displayed appropriately. If a focus target (designated by the focus position) stored in the text browsing mode can not be used as a target to display in the full browsing mode or a focus target in the full browsing mode, displaying operation in the full browsing mode may be performed so that an item (an object) adjacent to the stored focus position may be used as a focus target in the full browsing mode. For example, if a focus position is stored as the number of bytes from the top of a page, an item (an object) having the minimum number of bytes (i.e. having a minimum distance) from the focus target (designated by the stored focus position) may be used as a focus target in the full browsing mode.

Such a situation occurs when a focus is located, for example, on an anchor or a form element in descendants of a <nonscript> element (which is an element defining information displayed only when a browser does not support scripts), or on an anchor or a form element which is assigned invisible attributes (i.e. "display:none" or "visibility:hidden") by a CSS. The reason why the above mentioned situation occurs is that since an external script and an external CSS are not applied in onscreen representation in the text browsing mode, an item (an object), which can not be used as a focus target in the full browsing mode, can be used as a focus target in the text browsing mode. That is because those are not displayed or hidden in the full browsing mode. Further, if a focus position is stored as the number of bytes from the top of a page, an item located at a front side of a position corresponding to the stored byte number (i.e. stored a focus position) or an item located at a rear side of a position corresponding to the stored byte number may be used as a focus target in the full browsing mode.

As described above, since the focus position and the scroll position of the browsing mode before the representation switching are stored being correspond to the HTML document, the focus position and the scroll position can be restored after the browsing mode is automatically changed from the text browsing mode to the full browsing mode. It is understood that the user can continue browsing smoothly even if the representation switching is made because according to the configuration of the browser the focus position and the scroll position are restored.

If the browser is not configured to restore the focus position and the scroll position, troublesome operation is needed, for example, to move a focus, which may be located at a position on a screen of a next browsing mode different from an original position of a focus designated on representation of a previous browsing mode, to its previous position on the screen of a next browsing mode.

It is understood that the restoring of the focus position and the scroll position may be performed when the browsing mode is changed from the full browsing mode to the text browsing mode or may be performed at every browsing mode switching.

The restoring of the focus position and the scroll position may be executed in combination with one of the user selection switching operation #1 and the user selection switching operation #2. Consequently, the usability is enhanced in regard to browsing operation.

Although the present invention has been described in considerable detail with reference to certain preferred embodiments thereof, other embodiments are possible.

In the above mentioned embodiment, a web page made by an HTML is subjected to the rendering process according to the embodiment. However, the embodiment may be modified to process pages made by various types of markup languages including SMIL (Synchronized Multimedia Integration Language), SVG (Scalable Vector Graphics) and XML (eXtensible Markup Language).

In the above mentioned embodiment, the rendering process is executed by a mobile phone. However, the rendering process according to the embodiment may also be executed by various types of terminal devices such as a PDA, a vehicle-installed device and a network-connected home appliance. Also, the rendering process according to the embodiment may be executed by a computer having relatively high performance such as a personal computer. It is understood the above mentioned advantages of the embodiment are also attained when the rendering process according to the embodiment is applied to the above mentioned various types of devices.

The invention claimed is:

1. A method of rendering a page, comprising:
    starting obtaining operation for obtaining, over a network, a page made by a markup language and definition information, which is information to be applied to the entire page so as to render the page as designated by a markup language document of the page, the obtaining performed in response to a user request for the page;
    performing a text browsing mode operation on obtained part of data of the page in parallel with the obtaining operation of the page and definition information;
    displaying text from the obtained part of data of the page in a text browsing mode without using definition information;
    judging whether or not acquisition of the entirety of the definition information is obtained from over the network; and
    switching onscreen representation, depending on a result of the judging, by replacing the onscreen representation in the text browsing mode in which the definition information is not applied, with an onscreen representation in which the definition information is applied.

2. The method according to claim 1, further comprising judging whether or not predetermined user operation is performed,
    wherein the predetermined user operation includes operation for canceling the switching of the onscreen repreentation, and
    wherein the switching of the onscreen representation is cancelled if it is judged by the judging that the predetermined user operation is performed, and the switching of the onscreen representation is performed if it is judged by the judging that the predetermined user operation is not performed.

3. The method according to claim 2,
    wherein the switching is controlled in three stages including a first stage from a start of the obtaining operation of the page to a time of completion of acquisition of text data of the page, a second stage from the time of the completion of acquisition of the text data of the page to a time of completion of acquisition of the definition information, and a third stage after the completion of acquisition of the definition information, and
    wherein the onscreen representation in the text browsing mode is made during the first stage, notification notifying execution of the switching is added to the onscreen representation in the text browsing mode during the second stage, and the onscreen representation in which the definition information is applied is made during the third stage if the predetermined user operation is not performed.

4. The method according to claim 3,
    wherein the operation for canceling the switching of the onscreen representation is allowed only in the second stage.

5. The method according to claim 2,
    wherein the operation for canceling the switching of the onscreen representation is allowed in a certain time period from completion of acquisition of the definition information.

6. The method according to claim 2,
    wherein the operation for canceling the switching of the onscreen representation is allowed in a certain time period between a first time before completion of acquisition of the definition information and a second time after the completion of acquisition of the definition information.

7. The method according to claim 2,
    wherein the onscreen representation in the text browsing mode is made during a first stage from a start of the obtaining operation of the page to a time of completion of acquisition of text data of the page, and wherein the operation for canceling the switching of the onscreen representation is allowed in a certain time period from completion of acquisition of the definition information.

8. The method according to claim 7,
wherein the operation for canceling the switching of the onscreen representation is not allowed in the first stage, and operation for canceling acquisition of the data of the page is allowed in the first stage.

9. The method according to claim 2,
wherein the operation for canceling the switching of the onscreen representation includes at least one of scrolling operation, storing operation and printing operation.

10. The method according to claim 1, further comprising:
storing information regarding a focus position and a scrolling position in the text browsing mode; and
restoring the focus position and the scrolling position, based on the stored information, in a mode in which the definition information is applied.

11. The method according to claim 10, wherein the restoring includes:
judging whether or not the focus position is within a displaying area defined by the scrolling position; and
adjusting the focus position so that the focus position is within the displaying area if it is judged that the focus position is not within the displaying area.

12. The method according to claim 11,
wherein the adjusting the focus position is performed so that a scrolling amount from the top of a page is minimized and a focus target is displayed appropriately.

13. The method according to claim 10,
wherein the restoring the focus position and the scrolling position is performed so that an item adjacent to the focus position to be restored is used as a focus target in the mode in which the definition information is applied if it is judged that a focus target in the text browsing mode does not exist at a position to be restored in the mode in which the definition information is applied.

14. The method according to claim 10,
wherein the onscreen representation in the text browsing mode and the onscreen representation in which the definition information is applied are made based on a same document described by a markup language of the page; and
wherein the information regarding the focus position and the scrolling position is stored in association with the same document.

15. The method according to claim 1,
wherein the definition information includes at least one of an external style sheet and an external script.

16. The method according to claim 15,
wherein the obtaining operation for obtaining the page includes:
(1) judging whether designation of an external style sheet is contained in the page, and obtaining the external style sheet through a network if it is judged that the designation of the external style sheet is contained in the page; and
(2) judging whether designation of an external script is contained in the page, and obtaining the external script through the network if it is judged that the designation of the external script is contained in the page.

17. The method according to claim 1, further comprising continuing obtaining operation for obtaining remaining data of the page and displaying operation for the remaining data of the page after the switching of the onscreen representation is performed.

18. A method of rendering a page, comprising:
starting obtaining operation for obtaining, over a network, a page made by a markup language and definition information, which is information to be applied to the entire page so as to render the page as designated by a markup language document of the page, the obtaining performed in response to a user request for the page;
performing a text browsing mode operation on obtained part of data of the page in parallel with the obtaining operation of the page and definition information;
displaying text from the obtained part of data of the page in a text browsing mode without using definition information;
judging whether or not data of a predetermined number of screenfulls of data of the page is obtained from over the network; and
switching onscreen representation, depending on a result of the judging, by replacing the onscreen representation in the text browsing mode in which the definition information is not applied, with an onscreen representation in which the definition information is applied.

19. A method of rendering a page, comprising:
starting obtaining operation for obtaining, over a network, a page made by a markup language and definition information, which is information to be applied to the entire page so as to render the page as designated by a markup language document of the page, the obtaining performed in response to a user request for the page;
performing a text browsing mode operation on obtained part of data of the page in parallel with the obtaining operation of the page and definition information;
displaying text from the obtained part of data of the page in a text browsing mode without using definition information;
judging whether or not a predetermined time period has elapsed from a start of the obtaining operation; and
switching onscreen representation, depending on a result of the judging, by replacing the onscreen representation in the text browsing mode in which the definition information is not applied, with an onscreen representation in which the definition information is applied.

20. A method of rendering a page, comprising:
starting obtaining operation for obtaining, over a network, a page made by a markup language and definition information, which is information to be applied to the entire page so as to render the page as designated by a markup language document of the page, the obtaining performed in response to a user request for the page;
performing a text browsing mode operation on obtained part of data of the page in parallel with the obtaining operation of the page and definition information;
displaying text from the obtained part of data of the page in a text browsing mode without using definition information;
judging whether or not predetermined user operation is performed; and
switching onscreen representation, depending on a result of the judging, by replacing the onscreen representation in the text browsing mode in which the definition information is not applied, with an onscreen representation in which the definition information is applied.

21. The method according to claim 20, wherein the predetermined user operation includes operation for canceling the switching of the onscreen representation, and wherein the switching of the onscreen representation is cancelled if it is judged by the judging that the predetermined user operation is performed, and the switching of the onscreen representation is performed if it is judged by the judging that the predetermined user operation is not performed.

22. The method according to claim 21, wherein the switching is controlled in three stages including a first stage from a start of the obtaining operation of the page to a time of completion of acquisition of text data of the page, a second stage from the time of the completion of acquisition of the text data of the page to a time of completion of acquisition of the definition information, and a third stage after the completion of acquisition of the definition information, and wherein the onscreen representation in the text browsing mode is made during the first stage, notification notifying execution of the switching is added to the onscreen representation in the text browsing mode during the second stage, and the onscreen representation in which the definition information is applied is made during the third stage if the predetermined user operation is not performed.

23. The method according to claim 22, wherein the operation for canceling the switching of the onscreen representation is allowed only in the second stage.

24. The method according to claim 21, wherein the operation for canceling the switching of the onscreen representation is allowed in a certain time period from completion of acquisition of the definition information.

25. The method according to claim 21, wherein the operation for canceling the switching of the onscreen representation is allowed in a certain time period between a first time before completion of acquisition of the definition information and a second time after the completion of acquisition of the definition information.

26. The method according to claim 21, wherein the onscreen representation in the text browsing mode is made during a first stage from a start of the obtaining operation of the page to a time of completion of acquisition of text data of the page, and wherein the operation for canceling the switching of the onscreen representation is allowed in a certain time period from completion of acquisition of the definition information.

27. The method according to claim 26, wherein the operation for canceling the switching of the onscreen representation is not allowed in the first stage, and operation for canceling acquisition of the data of the page is allowed in the first stage.

28. The method according to claim 21, wherein the operation for canceling the switching of the onscreen representation includes at least one of scrolling operation, storing operation and printing operation.

29. The method according to claim 20, wherein the predetermined user operation includes operation for performing the switching of the onscreen representation, and wherein according to the result of the judging, the switching of the onscreen representation is performed if a result of the judging is that the predetermined user operation is performed, and the switching of the onscreen representation is not performed if a result of the judging is that the predetermined user operation is not performed.

30. The method according to claim 29, wherein the screen representation is controlled in three stages including a first stage from a start of the obtaining operation of the page to a time of completion of acquisition of text data of the page, a second stage from the time of the completion of acquisition of the text data of the page to a time of completion of acquisition of the definition information, and a third stage after the completion of acquisition of the definition information, and wherein the onscreen representation in the text browsing mode is made during the first stage, notification notifying that execution of the switching is available is added to the onscreen representation in the text browsing mode during the second stage, and the onscreen representation in the text browsing mode is continued during the third stage unless the predetermined user operation is performed.

31. The method according to claim 30, wherein the operation for performing the switching of the onscreen representation is allowed in the second and third stages.

32. The method according to claim 20, further comprising:

storing information regarding a focus position and a scrolling position in the text browsing mode; and restoring the focus position and the scrolling position, based on the stored information, in a mode in which the definition information is applied.

33. The method according to claim 32, wherein the restoring includes:

judging whether or not the focus position is within a displaying area defined by the scrolling position; and adjusting the focus position so that the focus position is within the displaying area if it is judged that the focus position is not within the displaying area.

34. The method according to claim 33, wherein the adjusting the focus position is performed so that a scrolling amount from the top of a page is minimized and a focus target is displayed appropriately.

35. The method according to claim 32, wherein the restoring the focus position and the scrolling position is performed so that an item adjacent to the focus position to be restored is used as a focus target in the mode in which the definition information is applied if it is judged that a focus target in the text browsing mode does not exist at a position to be restored in the mode in which the definition information is applied.

36. The method according to claim 32, wherein the onscreen representation in the text browsing mode and the onscreen representation in the mode in which the definition information is applied are made on a same document described by a markup language of the page; and wherein the information regarding the focus position and the scrolling position is stored in association with the same document.

37. A method of rendering a page, comprising:

starting obtaining operation for obtaining, over a network, a page made by a markup language and definition information, which is information to be applied to the entire page so as to render the page as designated by a markup language document of the page, the obtaining performed in response to a user request for the page;

performing a text browsing mode operation on obtained part of data of the page in parallel with the obtaining operation of the page and definition information;

displaying text from the obtained part of data of the page in a text browsing mode without using definition information;

judging whether or not acquisition, from over the network, of the whole data of the page is completed; and switching onscreen representation, depending on a result of the judging, by replacing the onscreen representation in the text browsing mode in which the definition information is not applied, with an onscreen representation in which the definition information is applied.

38. A method of rendering a page, comprising:

starting obtaining operation for obtaining, over a network, a page made by a markup language and definition information, which is information to be applied to the entire page so as to render the page as designated by a markup language document of the page, the obtaining performed in response to a user request for the page;

performing a first browsing mode operation on obtained part of data of the page in parallel with the obtaining operation of the page and definition information;

displaying the obtained part of data of the page in a first browsing mode in which definition information designated in a first markup language document of the page is applied to the obtained part of the page;

judging whether or not data of a predetermined number of screenfulls of data of the page is obtained; and switching onscreen representation, depending on a result of the judging, from onscreen representation in the first browsing mode to onscreen representation in a second browsing mode in which definition information designated in a second markup language document of the page and applied to the entire page so as to render the page as designated by the document is applied.

39. A method of rendering a page, comprising:

starting obtaining operation for obtaining, over a network, a page made by a markup language in response to a user request for the text;

displaying text of the page in a first browsing mode which makes less rich presentation on a screen than a second browsing mode in which an external style sheet and an external script in the page are applied;

judging whether or not acquisition of the external style sheet and the external script is finished; and switching onscreen representation, depending on a result of the judging, from onscreen representation in the first browsing mode to onscreen representation in the second browsing mode.

40. The method according to claim 39, further comprising judging whether or not predetermined user operation is performed, wherein the predetermined user operation includes operation for canceling the switching of the onscreen representation, and wherein the switching of the onscreen representation if cancelled if it is judged by the judging that the predetermined user operation is performed, and the switching of the onscreen representation is performed if it is judged by the judging that the predetermined user operation is not performed.

41. The method according to claim 40, wherein the switching is controlled in three stages including a first stage from a start of the obtaining operation of the page to a time of completion of acquisition of text data of the page, a second stage from the time of the completion of acquisition of the text data of the page to a time of completion of acquisition of the external style sheet and the external script, and a third stage after the completion of acquisition of the external style sheet and the external script, and wherein the onscreen representation in the first browsing mode is made during the first stage, notification notifying execution of the switching is added to the onscreen representation in the first browsing mode during the second stage, and the onscreen representation in which the external style sheet and the external script are applied is made during the third stage if the predetermined user operation is not performed.

42. The method according to claim 41, wherein the operation for canceling the switching of the onscreen representation is allowed only in the second stage.

43. The method according to claim 40, wherein the operation for canceling the switching of the onscreen representation is allowed in a certain time period from completion of acquisition of the external style sheet and the external script.

44. The method according to claim 40, wherein the operation for canceling the switching of the onscreen representation is allowed in a certain time period between a first time before completion of acquisition of the external style sheet and the external script and a second time after the completion of acquisition of the external style sheet and the external script.

45. The method according to claim 40, wherein the onscreen representation in the first browsing mode is made during a first stage from a start of the obtaining operation of the page to a time of completion of acquisition of text data of the page, and wherein the operation for canceling the switching of the onscreen representation is allowed in a certain time period from completion of acquisition of the external style sheet and the external script.

46. The method according to claim 45, wherein the operation for canceling the switching of the onscreen representation is not allowed in the first stage, and operation for canceling acquisition of the data of the page is allowed in the first stage.

47. The method according to claim 40, wherein the operation for canceling the switching of the onscreen representation includes at least one of scrolling operation, storing operation and printing operation.

48. A method of rendering a page, comprising:

starting obtaining operation for obtaining, over a network, a page made by a markup language in response to a user request for the page;

displaying text of the page in a first browsing mode which makes less rich presentation on a screen than a second browsing mode in which an external style sheet and an external script in the page are applied;

judging whether or not acquisition of the whole data of the page over the network is completed; and switching onscreen representation, depending on a result of the judging, from onscreen representation in the first browsing mode to onscreen representation in the second browsing mode.

49. A terminal device, comprising:

a screen on which onscreen representation is formed;

a network interface interfacing with a network; and a processor configured to perform functions including:

(a) starting obtaining operation for obtaining, over a network, a page made by a markup language and definition information, which is information to be applied to the entire page so as to render the page as designated by a markup language document of the page, the obtaining performed through the network in response to a user request for the page;

(b) displaying text of the page in a first browsing mode which makes less rich presentation on the screen than a second browsing mode in which definition information is applied;

(c) judging whether or not acquisition of the entirety of the definition information is obtained from over the network; and (d) switching onscreen representation, depending on a result of the judging, by replacing the onscreen representation in the first browsing mode with an onscreen representation in the second browsing mode.

50. The terminal device according to claim 49, wherein the definition information includes an external style sheet and an external script.

51. The terminal device according to claim 49, wherein the controller further performs a function of judging whether or not predetermined user operation is performed,
wherein the predetermined user operation includes operation for canceling the switching of the onscreen representation, and
wherein the switching of the onscreen representation is cancelled if it is judged by the judging that the predetermined user operation is performed, and the switching of the onscreen representation is performed if it is judged by the judging that the predetermined user operation is not performed.

52. The terminal device according to claim 51,
wherein the switching is controlled in three stages including a first stage from a start of the obtaining operation of the page to a time of completion of acquisition of text data of the page, a second stage from the time of the completion of acquisition of the text data of the page to a time of completion of acquisition of the definition information, and a third stage after the completion of acquisition of the definition information, and
wherein the onscreen representation in the first browsing mode is made during the first stage, notification notifying execution of the switching is added to the onscreen representation in the first browsing mode during the second stage, and the onscreen representation in which the definition information is applied is made during the third stage if the predetermined user operation is not performed.

53. The terminal device according to claim 52,
wherein the operation for canceling the switching of the onscreen representation is allowed only in the second stage.

54. The terminal device according to claim 51,
wherein the operation for canceling the switching of the onscreen representation is allowed in a certain time period from completion of acquisition of the definition information.

55. The terminal device according to claim 51,
wherein the operation for canceling the switching of the onscreen representation is allowed in a certain time period between a first time before completion of acquisition of the definition information and a second time after the completion of acquisition of the definition information.

56. The terminal device according to claim 51,
wherein the onscreen representation in the first browsing mode is made during a first stage from a start of the obtaining operation of the page to a time of completion of acquisition of text data of the page, and
wherein the operation for canceling the switching of the onscreen representation is allowed in a certain time period from completion of acquisition of the definition information.

57. The terminal device according to claim 56,
wherein the operation for canceling the switching of the onscreen representation is not allowed in the first stage, and operation for canceling acquisition of the data of the page is allowed in the first stage.

58. The terminal device according to claim 51,
wherein the operation for canceling the switching of the onscreen representation includes at least one of scrolling operation, storing operation and printing operation.

59. The terminal device according to claim 49, wherein the controller further performs functions of:
storing information regarding a focus position and a scrolling position in the first browsing mode; and
restoring the focus position and the scrolling position, based on the stored information, in the second browsing mode.

60. The terminal device according to claim 59, wherein the restoring includes:
judging whether or not the focus position is within a displaying area defined by the scrolling position; and
adjusting the focus position so that the focus position is within the displaying area if it is judged that the focus position is not within the displaying area.

61. The terminal device according to claim 60,
wherein the adjusting the focus position is performed so that a scrolling amount from the top of a page is minimized and a focus target is displayed appropriately.

62. The terminal device according to claim 59,
wherein the restoring the focus position and the scrolling position is performed so that an item adjacent to the focus position to be restored is used as a focus target in the second browsing mode if it is judged that a focus target in the first browsing mode does not exist at a position to be restored in the second browsing mode.

63. The terminal device according to claim 59,
wherein the onscreen representation in the first browsing mode and the onscreen representation in the second browsing mode are made based on a same document described by a markup language of the page; and
wherein the information regarding the focus position and the scrolling position is stored in association with the same document.

64. The terminal device according to claim 49,
wherein the definition information includes at least one of an external style sheet and an external script.

65. The terminal device according to claim 64,
wherein the obtaining operation for obtaining the page includes:
(1) judging whether designation of an external style sheet is contained in the page, and obtaining the external style sheet through a network if it is judged that the designation of the external style sheet is contained in the page; and
(2) judging whether designation of an external script is contained in the page, and obtaining the external script through the network if it is judged that the designation of the external script is contained in the page.

66. The terminal device according to claim 49, the controller further performs a function of continuing obtaining operation for obtaining remaining data of the page and displaying operation for the remaining data of the page after the switching of the onscreen representation is performed.

67. A computer program product stored on a terminal device, the computer program product comprising a computer program executed to render a page, comprising instructions for:
   starting obtaining, over a network, a page made by a markup language in response to a user request for the page;
   displaying text of the page in a first browsing mode which makes less rich presentation on a screen than a second browsing mode in which an external style sheet and an external script in the page are applied;
   judging whether or not acquisition of the external style sheet and the external scrip is obtained from over the network; and
   switching onscreen representation, depending on a result of the judging, from onscreen representation in the first browsing mode to onscreen representation in the second browsing mode.

68. The computer program product according to claim 67, further comprising instructions for judging whether or not predetermined user operation is performed,
   wherein the predetermined user operation includes operation for canceling the switching of the onscreen representation, and
   wherein the switching of the onscreen representation if cancelled if it is judged by the judging that the predetermined user operation is performed, and the switching of the onscreen representation is performed if it is judged by the judging that the predetermined user operation is not performed.

69. The computer program product according to claim 68, wherein the switching is controlled in three stages including a first stage from a start of the obtaining operation of the page to a time of completion of acquisition of text data of the page, a second stage from the time of the completion of acquisition of the text data of the page to a time of completion of acquisition of the external style sheet and the external script, and a third stage after the completion of acquisition of the external style sheet and the external script, and
   wherein the onscreen representation in the first browsing mode is made during the first stage, notification notifying execution of the switching is added to the onscreen representation in the first browsing mode during the second stage, and the onscreen representation in which the external style sheet and the external script are applied is made during the third stage if the predetermined user operation is not performed.

70. The computer program product according to claim 69, wherein the operation for canceling the switching of the onscreen representation is allowed only in the second stage.

71. The computer program product according to claim 68, wherein the operation for canceling the switching of the onscreen representation is allowed in a certain time period from completion of acquisition of the external style sheet and the external script.

72. The computer program product according to claim 68, wherein the operation for canceling the switching of the onscreen representation is allowed in a certain time period between a first time before completion of acquisition of the external style sheet and the external script and a second time after the completion of acquisition of the external style sheet and the external script.

73. The computer program product according to claim 68, wherein the onscreen representation in the first browsing mode is made during a first stage from a start of the obtaining operation of the page to a time of completion of acquisition of text data of the page, and
   wherein the operation for canceling the switching of the onscreen representation is allowed in a certain time period from completion of acquisition of the external style sheet and the external script.

74. The computer program product according to claim 73, wherein the operation for canceling the switching of the onscreen representation is not allowed in the first stage, and operation for canceling acquisition of the data of the page is allowed in the first stage.

75. The computer program product according to claim 68, wherein the operation for canceling the switching of the onscreen representation includes at least one of scrolling operation, storing operation and printing operation.

76. The computer program product according to claim 67, further comprising instructions for:
   storing information regarding a focus position and a scrolling position in the first browsing mode; and
   restoring the focus position and the scrolling position, based on the stored information, in the second browsing mode.

77. The computer program product according to claim 76, wherein the restoring includes:
   judging whether or not the focus position is within a displaying area defined by the scrolling position; and
   adjusting the focus position so that the focus position is within the displaying area if it is judged that the focus position is not within the displaying area.

78. The computer program product according to claim 77, wherein the adjusting the focus position is performed so that a scrolling amount from the top of a page is minimized and a focus target is displayed appropriately.

79. The computer program product according to claim 76, wherein the restoring the focus position and the scrolling position is performed so that an item adjacent to the focus position to be restored is used as a focus target in the second browsing mode if it is judged that a focus target in the first browsing mode does not exist at a position to he restored in the second browsing mode.

80. The computer program product according to claim 76, wherein the onscreen representation in the first browsing mode and the onscreen representation in the second browsing mode are made based on a same document described by a markup language of the page; and
   wherein the information regarding the focus position and the scrolling position is stored in association with the same document.

* * * * *

UNITED STATES PATENT AND TRADEMARK OFFICE
CERTIFICATE OF CORRECTION

| | | |
|---|---|---|
| PATENT NO. | : 7,917,847 B2 | |
| APPLICATION NO. | : 10/577749 | |
| DATED | : March 29, 2011 | |
| INVENTOR(S) | : Michimasa Uematsu et al. | |

It is certified that error appears in the above-identified patent and that said Letters Patent is hereby corrected as shown below:

Title Page, Item (75) Inventors, delete "Takao Sekine, Tokyo (JP)" and insert --Takao Sekine, Saitama (JP)--.

Signed and Sealed this
Twentieth Day of December, 2011

David J. Kappos
*Director of the United States Patent and Trademark Office*